(12) United States Patent
Ortiz et al.

(10) Patent No.: US 11,210,648 B2
(45) Date of Patent: Dec. 28, 2021

(54) SYSTEMS, METHODS, AND DEVICES FOR SECURE GENERATION AND PROCESSING OF DATA SETS REPRESENTING PRE-FUNDED PAYMENTS

(71) Applicant: Royal Bank of Canada, Montreal (CA)

(72) Inventors: Edison U. Ortiz, Orlando, FL (US); Terry W. Lee, Toronto (CA); Marko Pavlovic, Toronto (CA); Arnold Badal-Badalian, Toronto (CA)

(73) Assignee: Royal Bank of Canada, Montreal (CA)

( * ) Notice: Subject to any disclaimer, the term of this patent is extended or adjusted under 35 U.S.C. 154(b) by 271 days.

(21) Appl. No.: 15/453,193

(22) Filed: Mar. 8, 2017

(65) Prior Publication Data
US 2017/0249622 A1    Aug. 31, 2017

Related U.S. Application Data

(63) Continuation-in-part of application No. 14/705,477, filed on May 6, 2015, now Pat. No. 10,846,692.
(Continued)

(51) Int. Cl.
*G06Q 40/00* (2012.01)
*G06Q 20/28* (2012.01)
(Continued)

(52) U.S. Cl.
CPC ............ *G06Q 20/28* (2013.01); *G06Q 20/20* (2013.01); *G06Q 20/3221* (2013.01);
(Continued)

(58) Field of Classification Search
None
See application file for complete search history.

(56) References Cited

U.S. PATENT DOCUMENTS 5,668,760 A    9/1997 Hazen
5,668,876 A    9/1997 Falk et al.
(Continued)

FOREIGN PATENT DOCUMENTS

CA    2837208    12/2012
CA    2852059    4/2013
(Continued)

OTHER PUBLICATIONS

Chen et al.; NFC Mobile Transactions and Authentication based on GSM Network, Second Internation Workshop on Near Field Communication; pp. 83-89 IEE Computer Society.
(Continued)

*Primary Examiner* — Olabode Akintola
(74) *Attorney, Agent, or Firm* — Norton Rose Fulbright Canada LLP

(57) ABSTRACT

Systems 10, devices 106, methods, and non-transient machine-interpretable programming and/or other instruction products for the generation, transfer, storage, and other processing of secure data sets 11 used in electronic payment transactions, including particularly the secure creation, administration, manipulation, processing, and storage of electronic data useful in processing of pre-funded, pre-paid, and/or otherwise pre-authorized payment transactions. Devices 106, 100, 101 and methods in accordance with the disclosure can be used to create pre-funded payment token data sets 11, the token data sets comprising secure data items or records representing negotiable monetary or other economic value, and to share them between network communication devices 106 such as smart phones, home or business desktop computers, etc., for use in purchases and other transactions.

20 Claims, 21 Drawing Sheets

Related U.S. Application Data which is a continuation of application No. 14/287,134, filed on May 26, 2014, now abandoned, which is a continuation of application No. 14/056,440, filed on Oct. 17, 2013, now Pat. No. 9,082,119, said application No. 14/705,477 is a continuation of application No. 14/056,440, filed on Oct. 17, 2013, now Pat. No. 9,082,119, application No. 15/453,193, which is a continuation-in-part of application No. 14/869,186, filed on Sep. 29, 2015, which is a continuation-in-part of application No. 14/705,477, filed on May 6, 2015, now Pat. No. 10,846,692, application No. 15/453,193, which is a continuation-in-part of application No. 14/879,913, which is a continuation-in-part of application No. 15/201,428, filed on Jul. 2, 2016, now Pat. No. 11,080,701, which is a continuation-in-part of application No. 15/000,685, filed on Jan. 19, 2016, now Pat. No. 11,080,700, application No. 15/453,193, filed on May 6, 2015, now Pat. No. 10,846,692, which is a continuation-in-part of application No. 15/000,685, filed on Jan. 19, 2016, now Pat. No. 11,080,700, application No. 15/453,193, which is a continuation-in-part of application No. 14/879,913, filed on Oct. 9, 2015.

(60) Provisional application No. 61/715,142, filed on Oct. 17, 2012, provisional application No. 61/811,783, filed on Apr. 14, 2013, provisional application No. 61/825,865, filed on May 21, 2013, provisional application No. 61/833,188, filed on Jun. 10, 2013, provisional application No. 61/863,593, filed on Aug. 8, 2013, provisional application No. 62/056,688, filed on Sep. 29, 2014, provisional application No. 62/058,799, filed on Oct. 2, 2014, provisional application No. 62/065,280, filed on Oct. 17, 2014, provisional application No. 62/078,683, filed on Nov. 12, 2014, provisional application No. 62/084,549, filed on Nov. 25, 2014, provisional application No. 62/089,210, filed on Dec. 8, 2014, provisional application No. 62/118,990, filed on Feb. 20, 2015, provisional application No. 62/105,061, filed on Jan. 19, 2015, provisional application No. 62/188,067, filed on Jul. 2, 2015, provisional application No. 62/200,859, filed on Aug. 4, 2015, provisional application No. 62/062,467, filed on Oct. 10, 2014, provisional application No. 62/305,429, filed on Mar. 8, 2016.

(51) Int. Cl.
| | | |
|---|---|---|
| *H04L 29/06* | (2006.01) | |
| *G06Q 20/40* | (2012.01) | |
| *G06Q 20/36* | (2012.01) | |
| *G06Q 20/32* | (2012.01) | |
| *G06Q 20/38* | (2012.01) | |
| *G06Q 20/34* | (2012.01) | |
| *G06Q 20/20* | (2012.01) | |

(52) U.S. Cl.
CPC ..... *G06Q 20/3223* (2013.01); *G06Q 20/3278* (2013.01); *G06Q 20/351* (2013.01); *G06Q 20/36* (2013.01); *G06Q 20/367* (2013.01); *G06Q 20/3672* (2013.01); *G06Q 20/385* (2013.01); *G06Q 20/387* (2013.01); *G06Q 20/40* (2013.01); *H04L 63/0428* (2013.01); *G06Q 2220/00* (2013.01); *H04L 2209/56* (2013.01); *H04L 2209/80* (2013.01)

(56) References Cited

U.S. PATENT DOCUMENTS

| | | | |
|---|---|---|---|
| 6,439,464 | B1 | 8/2002 | Fruhauf et al. |
| 6,763,399 | B2 | 7/2004 | Margalit et al. |
| 6,883,715 | B1 | 4/2005 | Fruhauf et al. |
| 6,988,657 | B1 | 1/2006 | Singer et al. |
| 6,991,173 | B2 | 1/2006 | Fruhauf |
| 7,011,247 | B2 | 3/2006 | Drabczuk et al. |
| 7,150,397 | B2 | 12/2006 | Morrow et al. |
| 7,249,266 | B2 | 7/2007 | Marglait et al. |
| 7,438,218 | B2 | 10/2008 | Dooley et al. |
| 7,529,700 | B1 | 5/2009 | Kessler |
| 7,647,404 | B2 | 1/2010 | Cooper et al. |
| 7,761,380 | B2 | 7/2010 | Katz |
| 7,848,980 | B2 | 12/2010 | Carlson |
| 8,046,495 | B2 | 10/2011 | Cooper et al. |
| 8,112,353 | B2 | 2/2012 | Li et al. |
| 8,121,874 | B1 | 2/2012 | Guheen et al. |
| 8,151,345 | B1 | 4/2012 | Yeager |
| 8,260,199 | B2 | 9/2012 | Kowalski |
| 8,332,272 | B2 | 12/2012 | Fisher |
| 8,352,749 | B2 | 1/2013 | von Behren et al. |
| 8,391,837 | B2 | 3/2013 | Corda |
| 8,417,643 | B2 | 4/2013 | Mardikar |
| 8,468,580 | B1 | 6/2013 | Casey et al. |
| 8,548,924 | B2 | 10/2013 | Yeager |
| 8,549,279 | B1 | 10/2013 | Sahasranaman et al. |
| 8,560,449 | B1 | 10/2013 | Sears et al. |
| 8,655,787 | B1 | 2/2014 | Griffin et al. |
| 8,682,802 | B1 | 3/2014 | Kannanari |
| 8,686,802 | B1 | 3/2014 | Kannanari |
| 8,751,294 | B2* | 6/2014 | Bhattacharya ......... G06Q 30/02 |
| | | | 705/14.1 |
| 8,818,867 | B2 | 8/2014 | Baldwin et al. |
| 9,082,119 | B2 | 7/2015 | Ortiz et al. |
| 9,177,313 | B1* | 11/2015 | Silverman .............. G06Q 40/04 |
| 9,195,984 | B1 | 11/2015 | Spector |
| 9,269,083 | B1* | 2/2016 | Jarajapu ............... G06Q 20/342 |
| 9,305,295 | B2 | 4/2016 | Laracey |
| 9,336,519 | B2 | 5/2016 | Young |
| 9,715,681 | B2 | 7/2017 | Hammad |
| 9,721,238 | B2 | 8/2017 | Salmon |
| 9,792,593 | B2 | 10/2017 | Hayhow et al. |
| 9,836,727 | B1 | 12/2017 | Brennan |
| 9,836,739 | B1 | 12/2017 | Borovsky |
| 10,055,740 | B2 | 8/2018 | Hanson |
| 10,521,780 | B1 | 12/2019 | Hopkins |
| 2002/0002538 | A1 | 1/2002 | Ling |
| 2002/0169984 | A1 | 11/2002 | Kumar |
| 2003/0028481 | A1 | 2/2003 | Flitcroft |
| 2004/0073688 | A1 | 4/2004 | Sampson |
| 2005/0097060 | A1 | 5/2005 | Lee et al. |
| 2006/0080545 | A1 | 4/2006 | Bagly et al. |
| 2006/0235761 | A1 | 10/2006 | Johnson |
| 2006/0235795 | A1 | 10/2006 | Johnson |
| 2006/0235796 | A1 | 10/2006 | Johnson |
| 2006/0255158 | A1 | 11/2006 | Margalit et al. |
| 2007/0088952 | A1 | 4/2007 | Hewitt et al. |
| 2007/0125838 | A1 | 6/2007 | Law et al. |
| 2007/0143828 | A1 | 6/2007 | Jeal |
| 2007/0255653 | A1 | 11/2007 | Tumminaro et al. |
| 2007/0256124 | A1* | 11/2007 | Ih .......................... G06F 21/335 |
| | | | 726/9 |
| 2008/0040285 | A1 | 2/2008 | Wankmueller |
| 2008/0103923 | A1 | 5/2008 | Rieck et al. |
| 2008/0163257 | A1 | 7/2008 | Carlson |
| 2008/0283591 | A1 | 11/2008 | Oder et al. |
| 2009/0064294 | A1 | 3/2009 | Cook |
| 2009/0104886 | A1 | 4/2009 | Minamino et al. |
| 2009/0104888 | A1 | 4/2009 | Cox |
| 2009/0240620 | A1 | 9/2009 | Kendrick et al. |
| 2009/0254440 | A1 | 10/2009 | Pharris |
| 2009/0271262 | A1 | 10/2009 | Hammad |
| 2009/0294527 | A1 | 12/2009 | Brabson et al. |
| 2010/0030697 | A1 | 2/2010 | Goodrich et al. |
| 2010/0042538 | A1 | 2/2010 | Dheer et al. |
| 2010/0063893 | A1 | 3/2010 | Townsend |

(56) References Cited

U.S. PATENT DOCUMENTS

| | | |
|---|---|---|
| 2010/0094755 A1 | 4/2010 | Kloster |
| 2010/0145860 A1 | 6/2010 | Pelegero |
| 2010/0148928 A1 | 6/2010 | Yeager et al. |
| 2010/0257612 A1 | 10/2010 | McGuire et al. |
| 2010/0274692 A1 | 10/2010 | Hammad |
| 2010/0306076 A1 | 12/2010 | Taveau et al. |
| 2011/0161233 A1 | 6/2011 | Tieken |
| 2011/0166992 A1* | 7/2011 | Dessert ............ G06Q 20/0655 705/39 |
| 2011/0208659 A1 | 8/2011 | Easterly et al. |
| 2011/0225090 A1 | 9/2011 | Hammad |
| 2011/0251892 A1 | 10/2011 | Laracey |
| 2011/0307710 A1 | 12/2011 | McGuire et al. |
| 2011/0320344 A1 | 12/2011 | Faith et al. |
| 2012/0005038 A1 | 1/2012 | Soman |
| 2012/0028609 A1 | 2/2012 | Hruska |
| 2012/0030044 A1 | 2/2012 | Hurst |
| 2012/0030047 A1 | 2/2012 | Fuentes |
| 2012/0031969 A1 | 2/2012 | Hammad |
| 2012/0041881 A1 | 2/2012 | Basu et al. |
| 2012/0078735 A1 | 3/2012 | Bauer et al. |
| 2012/0078782 A1 | 3/2012 | Schoenberg et al. |
| 2012/0084210 A1 | 4/2012 | Farahmand |
| 2012/0116902 A1 | 5/2012 | Cardina et al. |
| 2012/0131655 A1 | 5/2012 | Bender et al. |
| 2012/0150668 A1 | 6/2012 | Wade |
| 2012/0159163 A1 | 6/2012 | Behren |
| 2012/0173432 A1 | 7/2012 | Yeager |
| 2012/0197797 A1 | 8/2012 | Grigg |
| 2012/0203700 A1 | 8/2012 | Ornce et al. |
| 2012/0209749 A1 | 8/2012 | Hammad |
| 2012/0214443 A1 | 8/2012 | Daigle |
| 2012/0239417 A1 | 9/2012 | Pourfallah et al. |
| 2012/0259782 A1 | 10/2012 | Hammad |
| 2012/0260324 A1 | 10/2012 | Lenon et al. |
| 2012/0267432 A1 | 10/2012 | Kuttuva |
| 2012/0271705 A1 | 10/2012 | Postrel |
| 2012/0259781 A1 | 11/2012 | Fote et al. |
| 2012/0290376 A1 | 11/2012 | Dryer |
| 2012/0296725 A1 | 11/2012 | Dessert |
| 2012/0316992 A1 | 12/2012 | Oborne |
| 2012/0317036 A1 | 12/2012 | Bower et al. |
| 2012/0317628 A1 | 12/2012 | Yeager |
| 2013/0006860 A1 | 1/2013 | Balasubramanian et al. |
| 2013/0018793 A1 | 1/2013 | Wong |
| 2013/0024383 A1 | 1/2013 | Kannappan |
| 2013/0031006 A1 | 1/2013 | McCullagh et al. |
| 2013/0036048 A1 | 2/2013 | Campos et al. |
| 2013/0041823 A1 | 2/2013 | Wagner |
| 2013/0054474 A1 | 2/2013 | Yeager |
| 2013/0030618 A1 | 3/2013 | Barton et al. |
| 2013/0060618 A1 | 3/2013 | Barton et al. |
| 2013/0060708 A1 | 3/2013 | Oskolkov et al. |
| 2013/0091061 A1 | 4/2013 | Caulkett et al. |
| 2013/0095810 A1 | 4/2013 | Moreton et al. |
| 2013/0097081 A1 | 4/2013 | Leavitt et al. |
| 2013/0110658 A1 | 5/2013 | Lyman et al. |
| 2013/0110675 A1 | 5/2013 | Bouw |
| 2013/0138521 A1 | 5/2013 | Want et al. |
| 2013/0151405 A1 | 6/2013 | Head et al. |
| 2013/0166913 A1 | 6/2013 | Lenon |
| 2013/0179352 A1 | 7/2013 | Dwyre |
| 2013/0218657 A1* | 8/2013 | Salmon ................ G06Q 20/381 705/14.29 |
| 2013/0238455 A1 | 9/2013 | Laracey |
| 2013/0254117 A1 | 9/2013 | Mueller |
| 2013/0275308 A1 | 10/2013 | Paraskeva et al. |
| 2013/0339188 A1* | 12/2013 | Mohamed ............ G06Q 20/027 705/26.41 |
| 2014/0006280 A1 | 1/2014 | Scipioni |
| 2014/0025958 A1 | 1/2014 | Calman et al. |
| 2014/0032419 A1 | 1/2014 | Anderson et al. |
| 2014/0040133 A1 | 2/2014 | Lee |
| 2014/0040148 A1 | 2/2014 | Ozvat et al. |
| 2014/0058951 A1 | 2/2014 | Kuppuswamy |
| 2014/0067677 A1 | 3/2014 | Ali |
| 2014/0074637 A1 | 3/2014 | Hammad |
| 2014/0074701 A1* | 3/2014 | Kingston ............... G06Q 20/14 705/40 |
| 2014/0081838 A1 | 3/2014 | Calman |
| 2014/0108263 A1 | 4/2014 | Ortiz et al. |
| 2014/0164243 A1 | 6/2014 | Aabye et al. |
| 2014/0279552 A1 | 9/2014 | Ortiz et al. |
| 2014/0344153 A1 | 11/2014 | Raj |
| 2015/0012428 A1 | 1/2015 | Gray |
| 2015/0032627 A1 | 1/2015 | Dill et al. |
| 2015/0046330 A1 | 2/2015 | Hanafi |
| 2015/0052064 A1 | 2/2015 | Karpenko et al. |
| 2015/0058191 A1 | 2/2015 | Khan |
| 2015/0100495 A1 | 4/2015 | Salama |
| 2015/0112870 A1 | 4/2015 | Nagasundaram |
| 2015/0112871 A1 | 4/2015 | Kumnick |
| 2015/0120472 A1 | 4/2015 | Aabye et al. |
| 2015/0186871 A1 | 7/2015 | Laracey |
| 2015/0213435 A1 | 7/2015 | Douglas et al. |
| 2015/0235212 A1 | 8/2015 | Ortiz |
| 2015/0254635 A1 | 9/2015 | Bondesen |
| 2015/0254643 A1 | 9/2015 | Bondesen |
| 2015/0254655 A1 | 9/2015 | Bondesen |
| 2015/0262180 A1 | 9/2015 | Hambleton |
| 2015/0332246 A1 | 11/2015 | Lafeer |
| 2015/0332264 A1 | 11/2015 | Bondesen |
| 2016/0019536 A1 | 1/2016 | Ortiz |
| 2016/0071094 A1 | 3/2016 | Krishnaiah |
| 2016/0086166 A1 | 3/2016 | Pomeroy |
| 2016/0104155 A1 | 4/2016 | McGaugh |
| 2016/0189291 A1 | 6/2016 | Nair |
| 2016/0210626 A1 | 7/2016 | Ortiz |
| 2016/0224977 A1 | 8/2016 | Sabba |
| 2016/0358172 A1 | 12/2016 | Ziat |
| 2016/0371668 A1* | 12/2016 | Priebatsch ............ G06Q 20/354 |
| 2017/0017958 A1 | 1/2017 | Scott |
| 2017/0161733 A1 | 6/2017 | Koletsky |
| 2017/0249622 A1 | 8/2017 | Ortiz |
| 2017/0323283 A1* | 11/2017 | Todasco ................. G06Q 20/28 |
| 2018/0137498 A1 | 5/2018 | Kim |
| 2018/0225660 A1 | 8/2018 | Chapman |

FOREIGN PATENT DOCUMENTS

| | | |
|---|---|---|
| CA | 2858203 | 6/2013 |
| CA | 2830260 | 4/2014 |
| CA | 2890335 | 5/2014 |
| CN | 101071490 A | 11/2007 |
| CN | 101226616 A | 7/2008 |
| CN | 103679443 A | 3/2014 |
| EP | 1843277 | 10/2007 |
| EP | 2048594 A1 | 4/2009 |
| EP | 2365469 A1 | 9/2011 |
| EP | 2145399 | 7/2012 |
| WO | 2002048846 | 6/2002 |
| WO | 2007122224 A1 | 1/2007 |
| WO | 2009001020 | 12/2008 |
| WO | 2010015734 A1 | 2/2010 |
| WO | 2012021864 A2 | 2/2012 |
| WO | 2013003372 A1 | 1/2013 |
| WO | 2013072613 A1 | 5/2013 |
| WO | 2015025282 A2 | 2/2015 |

OTHER PUBLICATIONS

Mantoro et al.; Online Payment Procedure Involving Mobile Phone Network Infrastructure and Devices; Dept of Computer Science, University Malaysia.

Tang et al.; A Mobile Identity Authentication Scheme of E-Commerce Based on Java-SIM Card, V2-114 to V2-118 School of Electronics Engineering, Beijing University.

USCIS Form I-9 "Instructions for Employment Eligibility Verification, 9 pages, Jan. 31, 2014, including p. 9 listing Lists of Acceptable Document" used to establish identity and employment authorization.

(56) References Cited

OTHER PUBLICATIONS

"First Time Applicants", Department of State, retrieved Feb. 12, 2015, 4 pages citing documents needed for applying for a passport.
International Search Report dated Jun. 23, 2017 in application No. PCT/CA2017/000050.
Written Opinion of International Search Authority dated Jun. 23, 2017 in application No. PCT/CA2017/000050.
Final Office Action dated Aug. 23, 2018 in U.S. Appl. No. 14/705,477.
Non-Final Office Action dated Oct. 18, 2018 in U.S. Appl. No. 15/000,685.
White, Ron, How Computers Work, Oct. 15, 2003, Paul Boger, Illustrated by Timothy Edward Downs, 7th Edition (Year: 2003).
Non-Final Office Action dated Feb. 14, 2019 in U.S. Appl. No. 14/869,186.
Non-Final Office Action dated Feb. 5, 2019 in U.S. Appl. No. 15/201,428.
Extended European Search Report dated Feb. 14, 2019 in EP Application No. 16816879.7.
Non-Final Office Action dated Apr. 15, 2019 in U.S. Appl. No. 14/705,477.
EESR dated May 7, 2018 in EP Application No. 15846067.5.
EESR dated Jan. 24, 2018 in EP Application No. 15848487.3.
EESR dated Jul. 3, 2018 in EP Application No. 16739695.1.
International Search Report dated Jul. 6, 2010 for Application No. PCT/AU2010/000546.
Office Action dated Aug. 6, 2014 in U.S. Appl. No. 14/287,134.
Office Action dated Oct. 22, 2015 in U.S. Appl. No. 14/287,134.
International Search Report and Written Opinion dated Jan. 19, 2016 in Application No. PCT/CA2015/000532.
International Preliminary Report on Patentability dated Apr. 11, 2017 in Application No. PCT/CA2015/000532.
International Search Report and Written Opinion dated May 2, 2016 in Application No. PCT/CA2016/000014.
International Preliminary Report on Patentability dated Jul. 25, 2017 in Application No. PCT/CA2016/000014.
International Search Report and Written Opinion dated Jan. 7, 2016 in Application No. PCT/CA2015/000519.
International Preliminary Report on Patentability dated Apr. 4, 2017 in Application No. PCT/CA2015/000519.
International Search Report and Written Opinion dated Oct. 14, 2016 in Application No. PCT/CA2016/000186.
International Preliminary Report on Patentability dated Jan. 2, 2018 in Application No. PCT/CA2016/000186.
International Search Report and Written Opinion dated Apr. 27, 2018 in Application No. PCT/CA2018/000017.
Office Action dated Feb. 5, 2018 in U.S. Appl. No. 14/705,477.
Office Action dated Aug. 27, 2014 in U.S. Appl. No. 14/056,440.
Office Action dated Aug. 3, 2016 in U.S. Appl. No. 14/142,072.
Office Action dated Oct. 15, 2014 in U.S. Appl. No. 14/287,134.
Office Action dated Feb. 19, 2015 in U.S. Appl. No. 14/287,134.
International Search Report and Written Opinion dated Oct. 12, 2017 in Application No. PCT/CA2017/000173.
Final Office Action dated Jul. 3, 2019 in U.S. Appl. No. 15/000,685.
Extended European Search Report dated Sep. 20, 2019 in EP Application No. 17762362.6.
Non-Final Office Action dated Jul. 24, 2019 in U.S. Appl. No. 15/414,065.
Non-Final Office Action dated Sep. 18, 2019 in U.S. Appl. No. 14/879,913.
Final Office Action dated Sep. 18, 2019 in U.S. Appl. No. 15/201,428.
Final Office Action dated Nov. 18, 2019 in U.S. Appl. No. 14/705,477.
Non-Final Office Action dated Nov. 12, 2019 in U.S. Appl. No. 15/884,847.
Non-Final Office Action dated Dec. 6, 2019 in U.S. Appl. No. 15/648,942.
Final Office Action dated Dec. 26, 2019 in U.S. Appl. No. 14/869,186.
Notice of Allowance dated Mar. 12, 2020 in U.S. Appl. No. 15/414,065.
Non-Final Office Action dated Jan. 29, 2020 in U.S. Appl. No. 15/201,428.
Non-Final Office Action dated Feb. 3, 2020 in U.S. Appl. No. 16/007,955.
Examination Report dated Feb. 11, 2020 in EP 15848487.3.
Office Action dated Mar. 26, 2020 issued in CN 201580064986.1.
Office Action dated Mar. 26, 2020 issued in CN 201580067059.5.
Office Action dated Mar. 12, 2020 issued in CN 201680016674.8.
Office Action dated Jun. 3, 2020 issued in U.S. Appl. No. 14/869,186.
Office Action dated Jun. 10, 2020 issued in U.S. Appl. No. 15/000,685.
Knott, What is Private Key Encryption, Koolspan, Mar. 6, 2014 retrieved from https://web.archive.org/web/20140306101755/http://www.koolspan.com/blog/private-key-encryption/ (Year: 2014).
Examination Report dated May 19, 2020 issued in EP 15846067.5.
Office Action dated Jul. 20, 2020 issued in U.S. Appl. No. 15/648,942.
Office Action dated Jul. 13, 2020 issued in U.S. Appl. No. 16/007,955.
Notice of Allowance dated Jun. 23, 2020 issued in U.S. Appl. No. 14/705,477.
Office Action dated Jun. 24, 2020 issued in U.S. Appl. No. 14/879,913.
Office Action dated Jul. 2, 2020 issued in U.S. Appl. No. 15/201,428.
Office Action dated Jul. 6, 2020 issued in U.S. Appl. No. 15/884,847.
Office Action dated May 19, 2020 issued in AU 2015330644.
Office Action dated Jun. 3, 2020 issued in AU 2015327722.
Verified by Visa Acquirer and Merchant Implementation Guide U.S. Region, May 2011, Visa, 114 pages (Year: 2011).
Visa 3-D Secure vs. MasterCard SPA, Gpayments Pty Ltd, Mar. 1, 2002, 37 pages (Year: 2002).
Office Action dated Jul. 6, 2020 issued in EP 17762362.6.
Office Action dated Nov. 16, 2020 issued in AU 2016208989.
Office Action dated Dec. 3, 2020 issued in CN 201580064986.1.
Office Action dated Nov. 30, 2020 issued in CN 201580067059.5.
Office Action dated Jan. 13, 2021 issued in U.S. Appl. No. 14/869,186.
Office Action dated Jan. 26, 2021 issued in EP 16739695.1.
Office Action dated Nov. 25, 2020 issued in CN 201680016674.8.
Notice of Allowance dated Mar. 30, 2021 issued in CA 2830260.
Notice of Allowance dated Mar. 25, 2021 issued in U.S. Appl. No. 15/201,428.
Notice of Allowance dated Mar. 24, 2021 issued in U.S. Appl. No. 15/000,685.
Office Action dated Apr. 12, 2021 issued in AU 2016287789.
Office Action dated Apr. 21, 2021 issued in U.S. Appl. No. 15/884,847.
Office Action dated Apr. 16, 2021 issued in AU 2015330644.
Office Action dated May 25, 2021 issued in U.S. Appl. No. 14/879,913.
Sao, J. et al., "A 2D Barcode-Based Mobile Payment System," 2009 Third International Conference on Multimedia and Ubiquitous Engineering, 2009, pp. 320-329, doi: 10.
Office Action dated May 25, 2021 issued in U.S. Appl. No. 16/007,955.
Office Action dated Jun. 9, 2021 issued in EP 15848487.3.
Office Action dated Apr. 13, 2021 issued in CN 201580064986.1.
Office Action dated May 18, 2021 issued in AU 2015330644.
Office Action dated Apr. 14, 2021 issued in CN 201580067059.5.
Office Action dated Apr. 30, 2021 issued in AU 2015327722.
Office Action dated May 4, 2021 issued in EP 16816879.7.
Notice of Allowance dated May 8, 2021 issued in CN 201680016674.8.
Office Action dated Aug. 30, 2021 issued in U.S. Appl. No. 15/648,942.
Office Action dated Oct. 13, 2021 issued in U.S. Appl. No. 15/884,847.

* cited by examiner

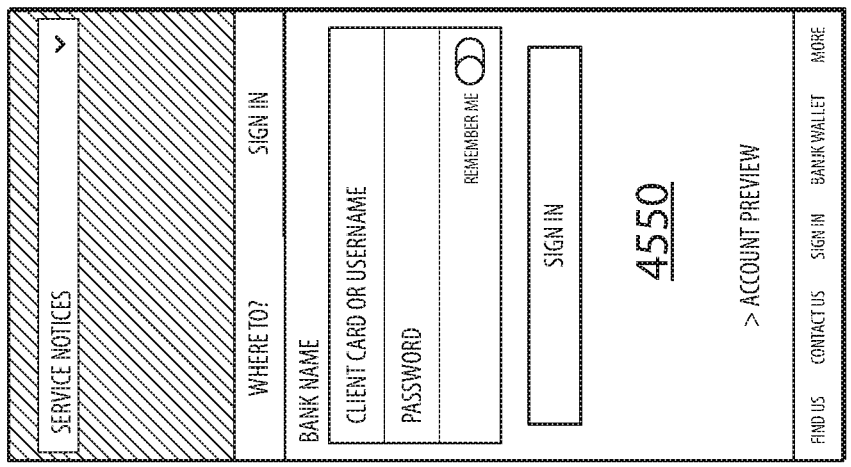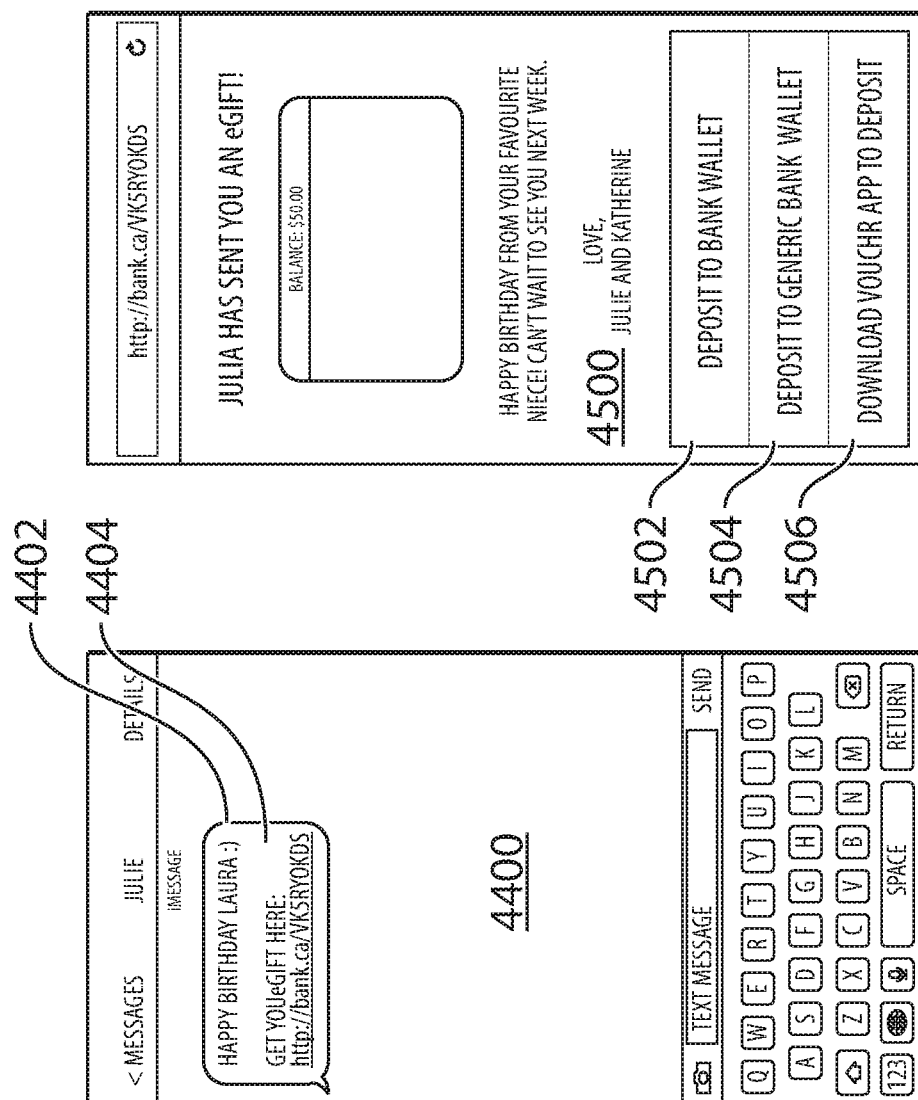
FIG. 6B

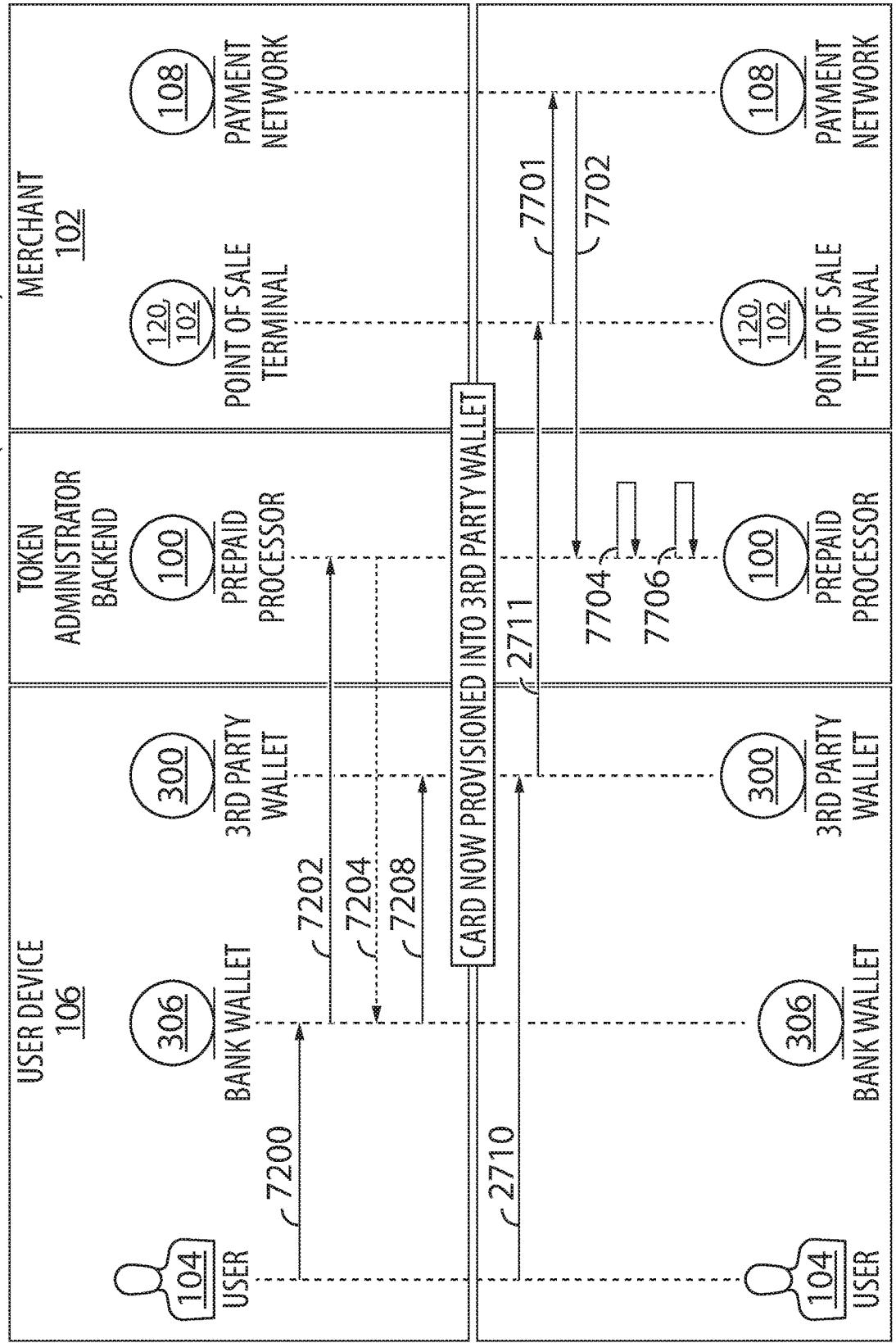

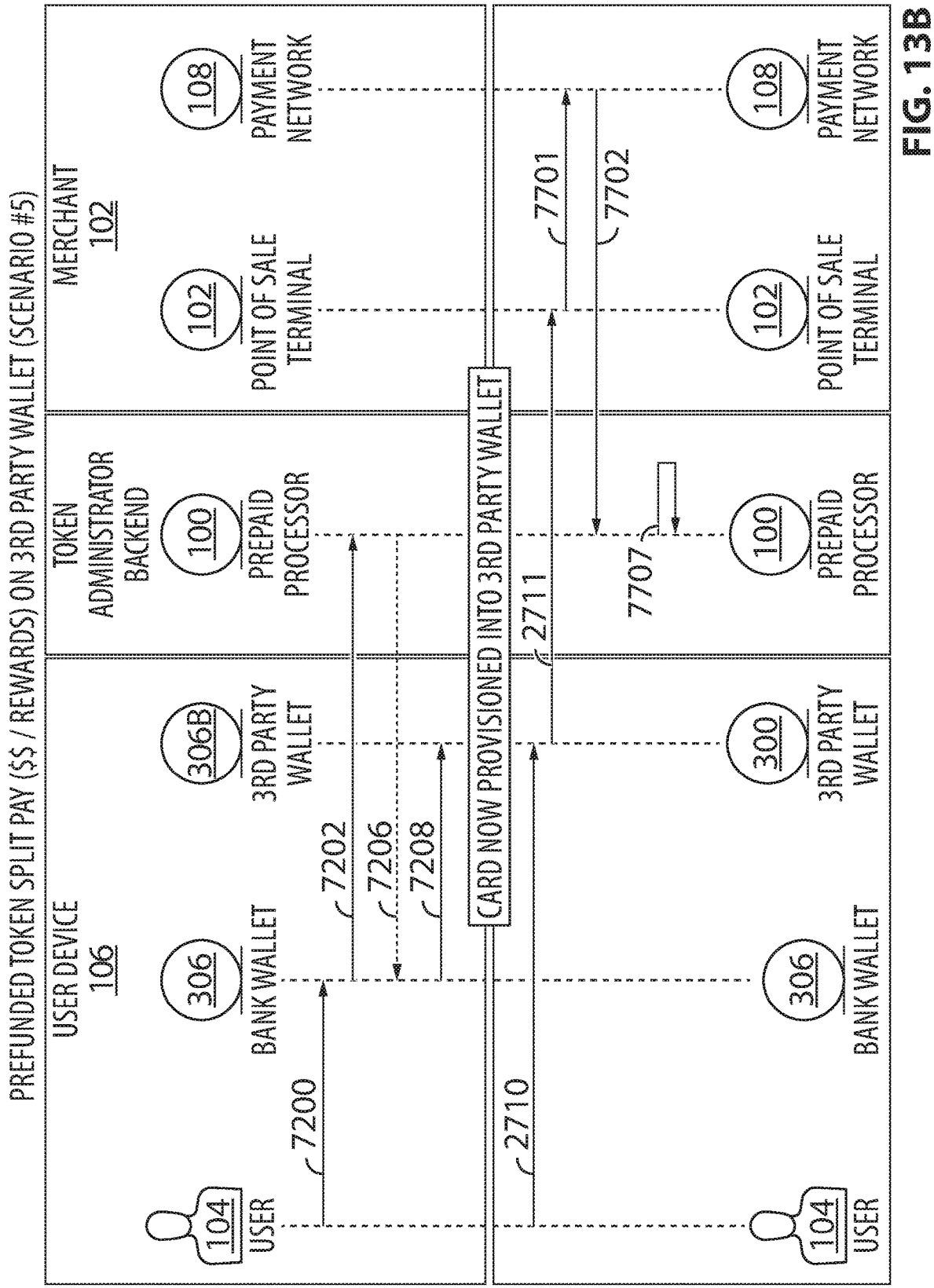

SYSTEMS, METHODS, AND DEVICES FOR SECURE GENERATION AND PROCESSING OF DATA SETS REPRESENTING PRE-FUNDED PAYMENTS

CROSS-REFERENCE TO RELATED APPLICATIONS

This application claims all benefit, including priority:
U.S. Provisional Patent Application Ser. No. 61/715,142, filed 17 Oct. 2012 and entitled SECURE PROCESSING AND STORAGE OF PAYMENT DATA;
U.S. Provisional Patent Application Ser. No. 61/811,783, filed 14 Apr. 2013 and entitled SECURE PROCESSING AND STORAGE OF PAYMENT DATA;
U.S. Provisional Patent Application Ser. No. 61/825,865, filed 21 May 2013 and entitled SECURE PROCESSING AND STORAGE OF PAYMENT DATA;
U.S. Provisional Patent Application Ser. No. 61/833,188, filed 10 Jun. 2013 and entitled SECURE PROCESSING AND STORAGE OF PAYMENT DATA;
U.S. Provisional Patent Application Ser. No. 61/863,593, filed 8 Aug. 2013 and entitled SECURE PROCESSING AND STORAGE OF PAYMENT DATA;
U.S. Provisional patent application Ser. No. 14/142,072, filed 27 Dec. 2013 and entitled VIRTUALIZATION AND SECURE PROCESSING OF DATA;
U.S. Provisional Patent Application Ser. No. 62/056,688, filed 29 Sep. 2014 and entitled SECURE PROCESSING OF TRANSACTION DATA;
U.S. Provisional Patent Application Ser. No. 62/058,799, filed 2 Oct. 2014 and entitled SECURE PROCESSING OF TRANSACTION DATA;
U.S. Provisional Patent Application Ser. No. 62/065,208, filed 17 Oct. 2014 and entitled SECURE PROCESSING OF TRANSACTION DATA;
U.S. Provisional Patent Application Ser. No. 62/078,683, filed 12 Nov. 2014 and entitled SECURE PROCESSING OF TRANSACTION DATA;
U.S. Provisional Patent Application Ser. No. 62/084,549, filed 25 Nov. 2014 and entitled COMPOUND TOKENIZATION OF DATA USED IN FINANCIAL OR OTHER TRANSACTIONS;
U.S. Provisional Patent Application Ser. No. 62/089,210, filed 8 Dec. 2014 and entitled ENCRYPTION KEYS IN ELECTRONIC PAYMENT TRANSACTIONS;
U.S. Provisional Patent Application Ser. No. 62/118,890, filed 20 Feb. 2015 and entitled ENCRYPTION KEYS IN ELECTRONIC PAYMENT TRANSACTIONS;
U.S. patent application Ser. No. 14/869,186, filed 29 Sep. 2015 and entitled SECURE PROCESSING OF TRANSACTION DATA;
U.S. Provisional Patent Application Ser. No. 62/105,061, filed 19 Jan. 2015 and entitled HOST CARD EMULATION FOR IN-APP PROCESSING OF MOBILE PAYMENTS;
U.S. Provisional Patent Application Ser. No. 62/200,859, filed 4 Aug. 2015 and entitled SECURE PROCESSING OF ELECTRONIC PAYMENTS;
U.S. Provisional Patent Application Ser. No. 62/188,067, filed 2 Jul. 2015 and entitled SECURE PROCESSING OF ELECTRONIC PAYMENTS;
U.S. patent application Ser. No. 15/000,685, filed 19 Jan. 2016 and entitled SECURE PROCESSING OF ELECTRONIC PAYMENTS;
U.S. Provisional Patent Application Ser. No. 62/062,467, filed 10 Oct. 2014 and entitled SYSTEM AND METHOD FOR ELECTRONIC PAYMENTS;
U.S. patent application Ser. No. 14/879,913, filed 9 Oct. 2015 and entitled SYSTEMS FOR PROCESSING ELECTRONIC TRANSACTIONS;
U.S. patent application Ser. No. 15/201,428, filed 2 Jul. 2016 and entitled SECURE PROCESSING OF ELECTRONIC PAYMENTS; and
U.S. Provisional Patent Application Ser. No. 62/305,429, filed 8 Mar. 2016 and entitled SECURE DATA SETS REPRESENTING PRE-FUNDED PAYMENTS.
the entire contents of each of which are incorporated herein by this reference.

TECHNICAL FIELD

The present disclosure relates generally to systems, methods, and machine-interpretable programming and/or other instruction devices for the generation, transfer, storage, and other processing of secure data sets used in electronic payment transactions. In particular, the disclosure relates to the secure creation, administration, manipulation, processing, and storage of electronic data useful in processing of pre-funded (pre-paid or otherwise pre-authorized) payment transactions.

Aspects of the material disclosed in this application relate to the creation, administration, manipulation, processing, and storage of data useful in processing of payment transactions. Aspects of such creation, administration, manipulation, processing, and storage may be subject to regulation by governmental and other agencies. The disclosure herein is made solely in terms of logical, economic, and communications possibilities, without regard to statutory, regulatory, or other legal considerations. Nothing herein is intended as a statement or representation that any system, method or process proposed or discussed herein, or the use thereof, does or does not comply with any statute, law, regulation, or other legal requirement in any jurisdiction; nor should it be taken or construed as doing so.

SUMMARY OF THE INVENTION

In various aspects, the disclosure provides systems, methods, and non-transient machine-interpretable programming and/or other instruction products for the generation, transfer, storage, and other processing of secure data sets used in electronic payment transactions, including particularly the secure creation, administration, manipulation, processing, and storage of electronic data useful in processing of pre-funded, pre-paid, and/or otherwise pre-authorized payment transactions.

For example, in various aspects and embodiments the disclosure provides mobile and other types network communication devices adapted for the generation, transfer, storage, and other processing of secure data sets used in electronic payment transactions, including particularly the secure creation, administration, manipulation, processing, and storage of electronic data useful in processing of pre-authorized payment transactions.

For example, in various aspects and embodiments systems, devices and methods in accordance with the disclosure can be used to create pre-funded payment token data sets, the token data sets comprising secure data items or records representing negotiable monetary or other economic value, and to share them between network communication devices such as smart phones, home or business desktop computers, etc., for use in purchases and other transactions.

In further aspects and embodiments, the disclosure provides servers and other data processing systems adapted for adjudicating requests received from network communication devices for the authorization of pre-funded, pre-paid, or otherwise pre-authorized payment transactions from network communication devices, and providing authorization tokens and/or other authorization data sets to the same and/or other network communication devices in response to the adjudication of such requests.

In various aspects and embodiments, for example, secure data sets representing pre-paid transaction payment tokens, or pre-funded authorizations, may be generated by, or at the request of, a first network or other data communication device, such as a computer or smart phone, and transferred directly or indirectly to one or more second network or other data communication devices, for local or remote storage, and ultimately presentation at a physical or virtual points of sale, such as a merchant or other vendor web sites, brick-and-mortar stores, etc. in order to complete a full or partial electronic purchase transactions. For example, a secure token representing an authorized pre-paid or pre-funded transaction value may be securely stored in a "smart" phone or other mobile or non-mobile network communication device, and presented electronically at a point of sale (POS) or other real or virtual point of transaction (POT) as legal tender of a specific, previously-authorized payment value, useful in completing, or helping to complete, a desired payment transaction, or as evidence of credit or other binding payment authorization. Such payment can, for example, be analogous to presentation of cash at the point of sale, or to presentation of a credit, chip or other value-transfer card in a 'card present' transaction.

The creation, storage, manipulation and other processing of data stored in secure environments can be implemented by, for example, the use of improved architectures and instruction sets that enable secure calling of programs, functions, and other routines, and data fetch and store commands from such remote secure systems, as described herein. Such secure calls may in effect be re-directed from calls to SIM cards or other secure memories on user devices to remote secure storage facilities.

In various embodiments, the invention provides methods and further components, including persistent (or "non-transient") machine-interpretable instruction sets, such as software, for implementing the various functions and processes described herein.

In various embodiments pre-funded token data sets generated in accordance with the disclosure can represent fully-negotiable virtual currency. In such embodiments, neither a merchant nor a bank nor any other financial institution (FI) may be required to perform any further authorizations, etc. at the time of completion of a proposed transaction; the pre-funded token can be treated legally by the merchant, etc., in much the same was as cash.

Among the many significant improvements offered by the invention is the ability to generate pre-funded token data sets, and references thereto, according to any desired payment protocols, so that they may be stored, interpreted, and otherwise processed by any desired payment systems or applications. Such protocols include, for example, any of the various credit transaction protocols (Visa, Mastercard, Europay), Apple Pay™, etc.

Pre-funded tokens in accordance with the invention can be funded by any one or more suitable types of value accounts, including cash, credit, debit (demand), loyalty, rewards, or other types of accounts. A single token may be funded using multiple funding sources; for example a single token can be funded partly be a demand (debit) account and partly by a credit, loyalty, and/or rewards account.

A significant type of funding source suitable for use in implementing the various aspects of the invention are pre-existing payment token data sets, pre-funded or otherwise. For example, a payment token previously generated, and stored on a user's mobile phone or other network communication device, or in secure storage associated with an issuing financial institution, can be used alone or in combination with other tokens, accounts, and/or funding sources as a complete or partial source of funding for a new, pre-funded token in accordance with the disclosure. As noted above, the newly-generated pre-funded token can be formatted in accordance with the same protocol as one or more of the funding source tokens, or according to an entirely different protocol, for processing by any desired applications or transaction systems.

Recipients of pre-funded tokens shared in accordance with the invention can be notified of the generation and/or transfer of such tokens in any desired ways, through the use of suitably-configured pre-funded token delivery notification data sets. Such data sets can comprise any desired or required data, including for example personalized data representing images, text messages, photos, videos, or other images, sound bites, or other types of content, or references thereto such as addresses associated with remote memories from which such content may be accessed.

Once they have been generated, pre-funded tokens in accordance with the disclosure may be used immediately, or they may be transferred to remote devices, such as secure memories maintained by issuing financial institutions (FIs) or other payment processors or trusted servers, or to a recipient's smart phone or other network communication device. For example, such tokens may be stored remotely, in secure memory administered by an issuing FI, and downloaded to or otherwise accessed by a user's mobile or desktop device at the time the user wishes to apply the token in full or partial satisfaction of a proposed transaction. As a further example, such tokens may be stored in secure memory on a user's data communication device, through the use and/or otherwise subject to control by a virtual wallet application operating on the user's device.

Among the many advantages provided by the invention are improvements in the issuance of virtual transaction values; enabling of closer and more remunerative merchant-consumer-FI relationships; integration of rewards and loyalty platforms with virtual wallets and user other applications and experiences, as well as merchant and FI systems; and the ability to use multiple funding sources, of disparate types, to finance payment and other transactions.

In addition, the invention enables issuing FIs and other payment processors to facilitate pre-funded transactions directly, without the involvement of third-party payment processors, with resultant improvements in reliability, economic efficiency (cost reduction), security, etc.

BRIEF DESCRIPTION OF THE DRAWINGS

Various aspects and embodiments of the invention are illustrated in the figures of the accompanying drawings, which are meant to be exemplary and not limiting, and in which like references are intended to refer to like or corresponding parts.

FIGS. 6B-8 are schematic diagrams illustrating embodiments of user interfaces useful in generating pre-funded token data sets and effecting pre-funded payment transactions in accordance with the disclosure.

DESCRIPTION OF EMBODIMENTS

Embodiments of various aspects of the invention are described through reference to the drawings.

Figure 1:
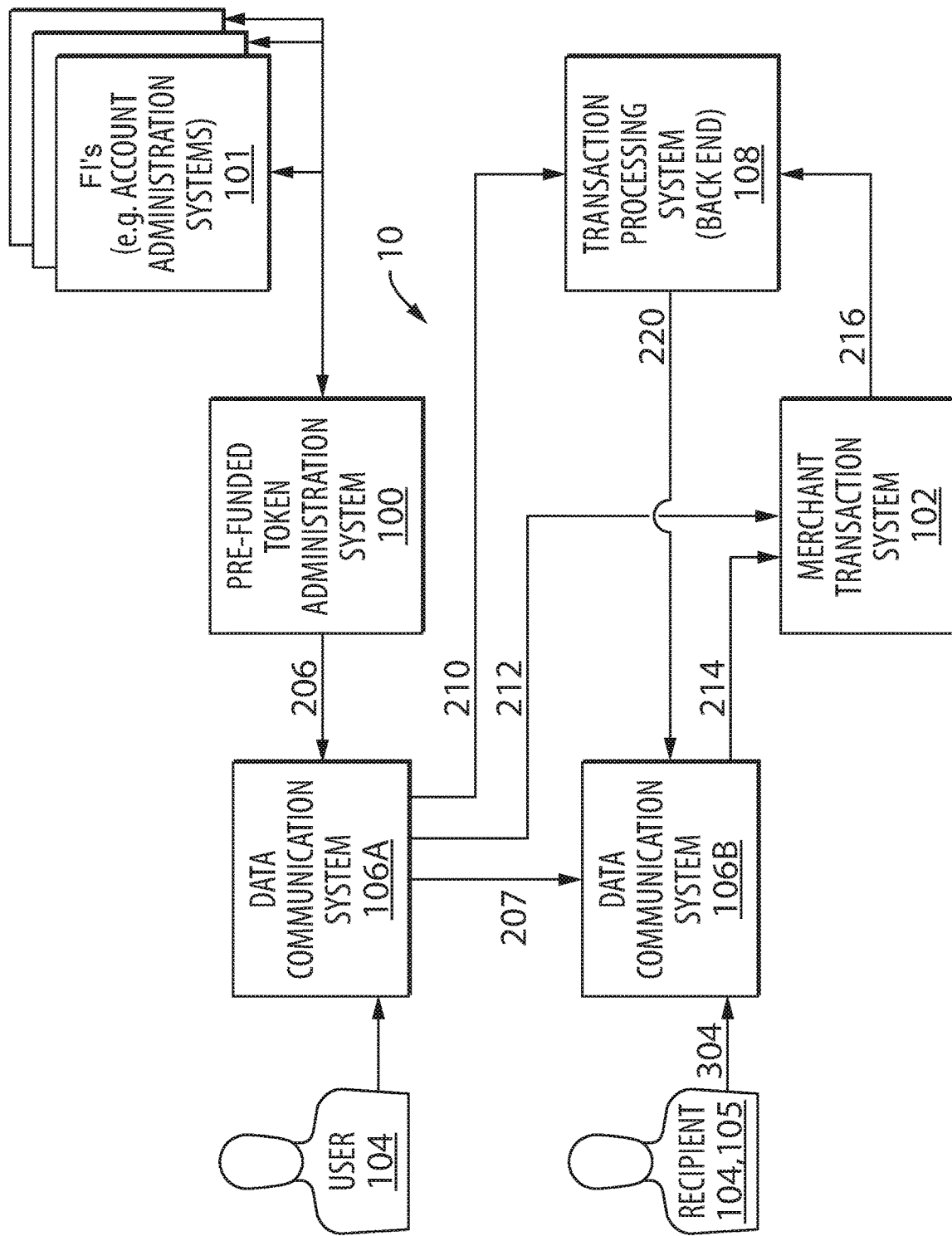
FIG. 1 is a schematic diagram showing an embodiment of a system for secure generation and processing of data sets representing pre-funded payments in accordance with aspects of the disclosure.

FIG. 1 is a schematic diagram showing an embodiment of a system 10 suitable for use in implementing various aspects and embodiments of the invention. In the embodiment shown in FIG. 1, system 10 comprises one or more mobile or other network (i.e., data) communication devices (or systems) 106, which are operable or otherwise controllable by user(s) 104,105; one or more issuing or other pre-funded token administration systems 100; merchant transaction systems 102; and transaction processing (or "back end") systems 108.

Users 104, 105, etc. can be or represent any individuals, businesses, enterprises, or other entities who may have any interest in acquiring, sharing, or otherwise processing pre-funded tokens as suggested or disclosed herein.

Data communicaton devices 106 can comprise any electronic data processors and communications subsystems configurable or otherwise suitable for use in controlling and/or otherwise facilitating communications over an electronic signal exchange network (e.g., the internet, the public switched telephone network (PSTN), etc.) and for generating signals representing commands and/or data suitable for use in implementing the processes disclosed herein. Devices 106 can include, for example, smart phones, tablet, laptop, 'wearable' devices that may be carried on a user's person or clothing, such as cellular or other radio telephones, personal data assistants (PDA), tablets, notepads, portable computers, smart watches or jewellery, etc., and/or other mobile devices, and home or business computers of desktop or any other types, comprising wireless and/or wireline computer and/or telephone network communications components, including for example any or all of cellular, satellite, and/or other long-, medium-, or short-range communication devices, including near-field communications (NFC), radio-frequency identification (RFID) systems, telephone protocol systems, etc., as well as any desired or otherwise useful memories or memory devices, which may be configured for secure generation, storage, and communication of electronic data signals.

Administration, merchant, and transaction processing systems 100, 102, 108 can comprise any desktop, server and/or other class data processing and communication system(s) suitable for signal communication, interpretation, and other processes in accordance with the disclosure. Merchant and transaction processing systems 102, 108, for example, can include POS, POT, and other transaction capturing, communications, processing, and storage devices suitable for such purposes.

Figure 2:
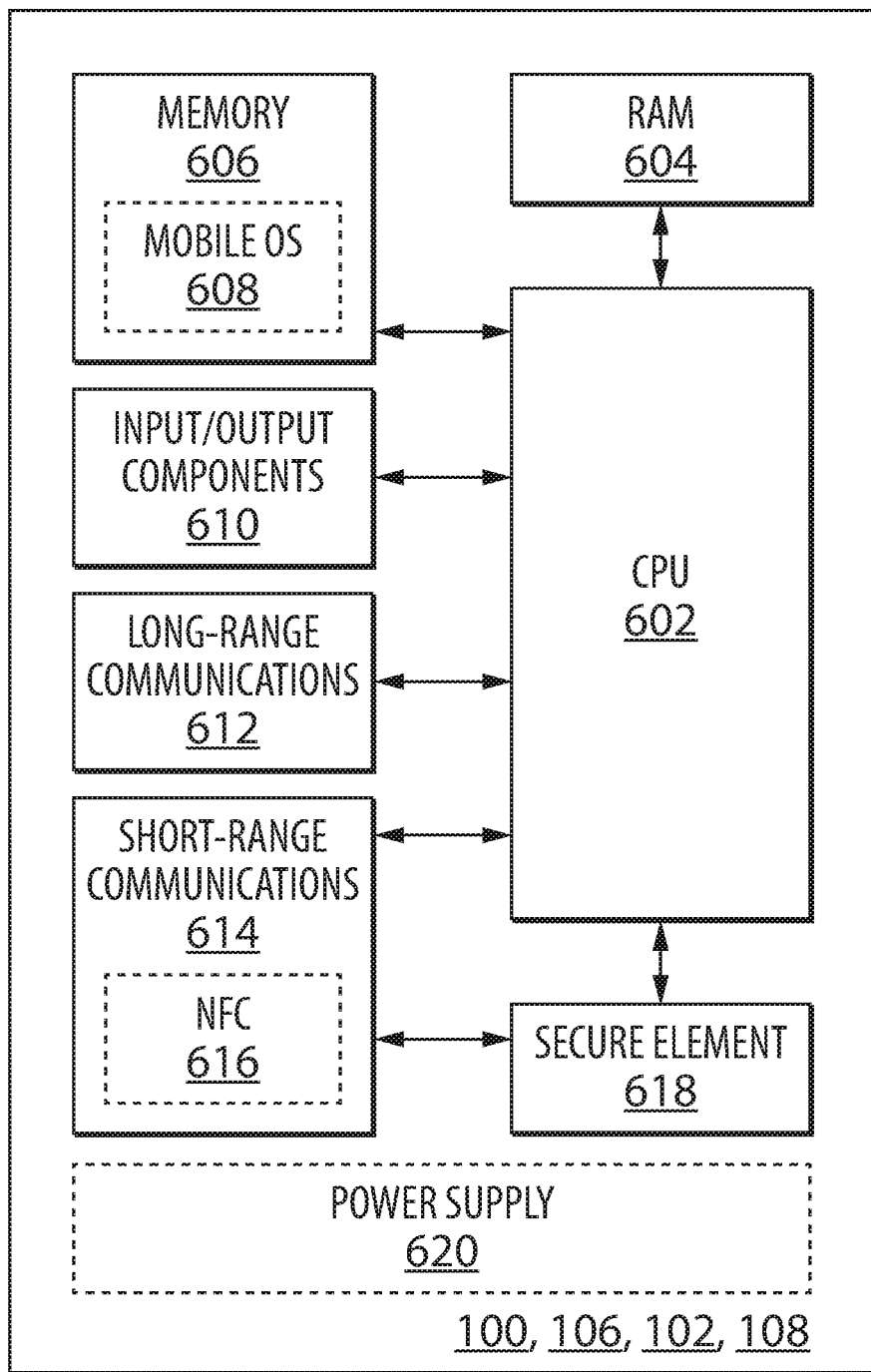
FIGS. 2 and 3 are schematic diagrams of data communication devices and systems in accordance with aspects of the disclosure.

As shown for Example in FIG. 2, any of systems 100, may be mobile (portable) or non-mobile (desktop, server, etc.) data processing and communication devices comprising one or more CPUs 602, random access memory(ies) (RAMs) 604, and other physical memory(ies) 606, either or both of which may store non-transient (i.e., persistent) data and machine interpretable instruction sets. In general, CPU(s) 602 can include any microprocessor(s) or other general or special purpose processing unit(s) configured to control the overall operation of the device 100, 102, 106, 108 and its various components. CPU(s) 602 may, for example, be connected by a bus or other electronic link(s) or path(s) adapted for transferring data, power, and/or other signals to the various components of the device 100, 102, 106, 108. Read and write operations of CPU 602 may be facilitated by RAM 604 and/or other integrated circuit or volatile memory storage(s) associated with or integrated within CPU 602 or to which CPU 602 has access for data communications.

Memory(ies) 606 may include one or more persistent (i.e., non-transitory) memory stores, such as flash memory or read-only memory (ROM), which are either physically embedded within mobile device 110, 600 or which may alternatively be removably loaded or inserted into mobile device 110, 600 by a user, administrator, or other party, such as on a subscriber identity module (SIM) card or secure digital (SD) memory card. Memory(ies) 606 may be used to store any type(s) of data and/or executable machine instruction files, such as but not limited to account, network address, security, personal identifiers, media files (music and photos), as well as software used to implement a suitably operating system (OS) 608, and other programs or applications, as described herein. Memory(ies) 606 may also be used to store one or more files used by CPU 602 or mobile OS 608 to execute different functions or control different components on mobile device 110, 600, such as contact information, network preferences, application data, and other files.

In various embodiments, device(s) 100, 102, 106, 108 may each also be equipped with one or more components to enable various users to generate command and other input signals, and otherwise control or interact with the device(s). Such components, which are generally denoted herein as 610, may provide both for the user to input data or commands into mobile device 110, 600, as well as to perceive data or information outputted by mobile device 110, 600. Without limitation, different possible input components 610 may include any desired numbers and varieties of touch pads or touchscreens, dials, click wheels, touchscreens, keyboards, and other buttons, as well as cameras, microphones, and biometric sensors (e.g., fingerprint scanners). Example output components 610 may include speakers, display screens and visual displays, rumble packs, and combinations thereof. Other I/O components 610 not specifically mentioned herein may also be included in different embodiments.

Figure 3:
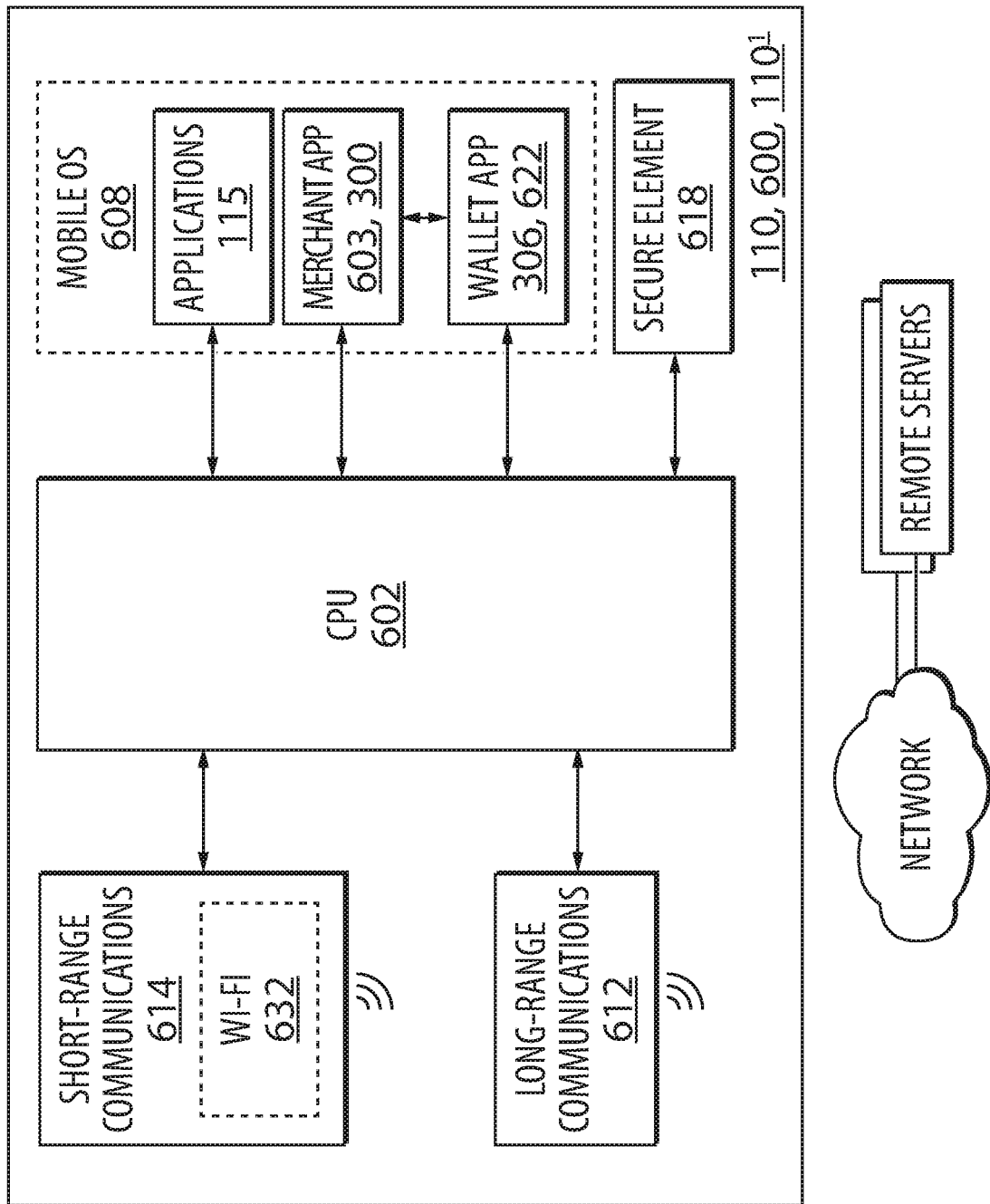

In various embodiments, as shown in FIGS. 2 and 3, device(s) 100, 102, 106, 108 each include one or more long-range network communications components 612 and/or one or more short-range network communications components 614 that provide the device(s) 100, 102, 106, 108 with desired voice and data communication functions and options. As will be appreciated by those skilled in the relevant arts, the terms "long-range" and "short-range" may be used herein to denote relative distances and are not intended to denote any specific limitations or ranges. Thus, long-range communications components 612 and short-range communications components 614 allow device(s) 100, 102, 106, 108 to communicate with other proximately or remotely located data communicaton system(s) 100, 102, 106, 108, which can be other similarly or differently configured mobile or non-mobile devices, servers, systems, and other network-enabled devices.

For example, long-range communications component(s) 612 may be used by a device 110, 600 to communicate with a desired device 100, 102, 106, 108 over cellular, satellite, public-switched telephone (PSTN) or other distributed network(s) using suitable voice and/or data communications protocols, such as but not limited to ITP, HTTP, and/or other packet-switched protocols, Time Division Multiple Access (TDMA), Code Division Multiple Access (CDMA), Global System for Mobile Communication (GSM), Wireless Application Protocol (WAP), and others. Following such protocols, a device 100, 102, 106, 108 may be able to send communications to arbitrarily remote devices of various types, including voice, data, and text-based messages without limitation. To enable long-range communications, various hardware and/or software components may be included in component 612, such as an antenna, transmitter, receiver, and digital signal processor. The specific configuration of long-range communications 612 may depend generally upon the communication protocol(s) that are implemented.

Short-range communications component(s) 614 may enable communication between mobile or other device(s) 100, 102, 106, 108 and other relatively proximately-located devices, servers, or systems. For example, short-range communication system(s) 614 may include one or more short-range transceivers 632, such as for connection to Wi-Fi (802.11 standard) or Bluetooth networks, as well as other modes of short-range communication, like RFID, infrared or optical. In some embodiments, short-range communications 614 may in particular include a near field communications (NFC) subsystem 616 that may be utilized to communicate with an NFC reader, among various different purposes or functions, so as to initiate contactless mobile payments with a merchant POS terminal as described further below. Alternatively, or in addition, camera(s) 610 and optical-recognition software may be utilized to enable the device(s) 100, 102, 106, 108 to interpret bar codes, QR codes, and/or other visual data.

In various embodiments, device(s) 100, 102, 106, 108 can each include one or more secure elements 618 configured for example as tamper-resistant, limited-access storage environments for sensitive data and other information, such as payment credentials, funding source data, payment tokens, cryptographic data, and programming structures, as disclosed herein. For example, secure element(s) 618 may include any or all of integrated circuit(s) (IC), operating system(s) (OS), and application(s) or program(s), including virtual wallet application(s) 306, 622 merchant application(s) 300, 630, card emulation applications 115 and the like. Secure element(s) 618 may be embedded (integrated) physically within a device 100, 102, 106, 108 or, alternatively, provided on a card such as a SIM or SD card that is insertable into mobile device 110, 600. As shown, both CPU 602 and other components such as NFC subsystem 616 may in some cases have direct communicative access to the contents of secure element 616. Alternatively, access may be limited to only one or the other of CPU 602 and NFC subsystem 616 depending on the application or configuration of the device 100, 102, 106, 108 and corresponding security devices.

Device 100, 102, 106, 108 may further include one or more power supply(ies) 620 configured with any components or circuitry that are suitable for generating, receiving or transmitting power to CPU 602 and other components of mobile device 110, 600. For example, a power supply 620 may include circuitry for processing power received from an external power source, such as an electrical utility or grid, when a device 100, 102, 106, 108 is a server or desktop system, or is a mobile device plugged into or otherwise connected to such external power source. In some cases, power supply 620 may further include one or more batteries, such as nickel metal hydride, nickel cadmium, and lithium-ion batteries, which may provide a source of power when the device 100, 102, 106, 108 external power supplies are not available. Other power generating or processing circuitry, such as solar panels or inductive coils, may also be included so that power supply 620 may deliver energy to different components within the device 100, 102, 106, 108. It should be noted that individual connections between power supply 620 and other components within device 100, 102, 106, 108 are not shown in FIG. 4 and instead power supply 620 is indicated for convenience only as an isolated element.

As described herein, system(s) 10 are useful, among other purposes, for the generation of pre-funded (e.g., gift, reward, and/or other prepaid) payment tokens; for sharing or other transfer of such tokens between user devices 106; and for use of such tokens in payment and other forms of electronic transactions. For example, using her or his data communication device 106A, a first user 104 can request that a prepaid (pre-funded or other pre-authorized) token be created, using for example funds from the user's bank account, and can cause the generated token to be delivered to a device 1066 used or otherwise controlled by a second user 105. The second user 105 can cause the prefunded token to be stored and/or otherwise processed by a virtual wallet or other secure memory or application on the second user's device 106B, or in the cloud, and ultimately used to complete a purchase transaction by being forwarded to a merchant transaction system 102 or transaction processing system 108 to satisfy a payment due with respect to the transaction.

Figure 4:
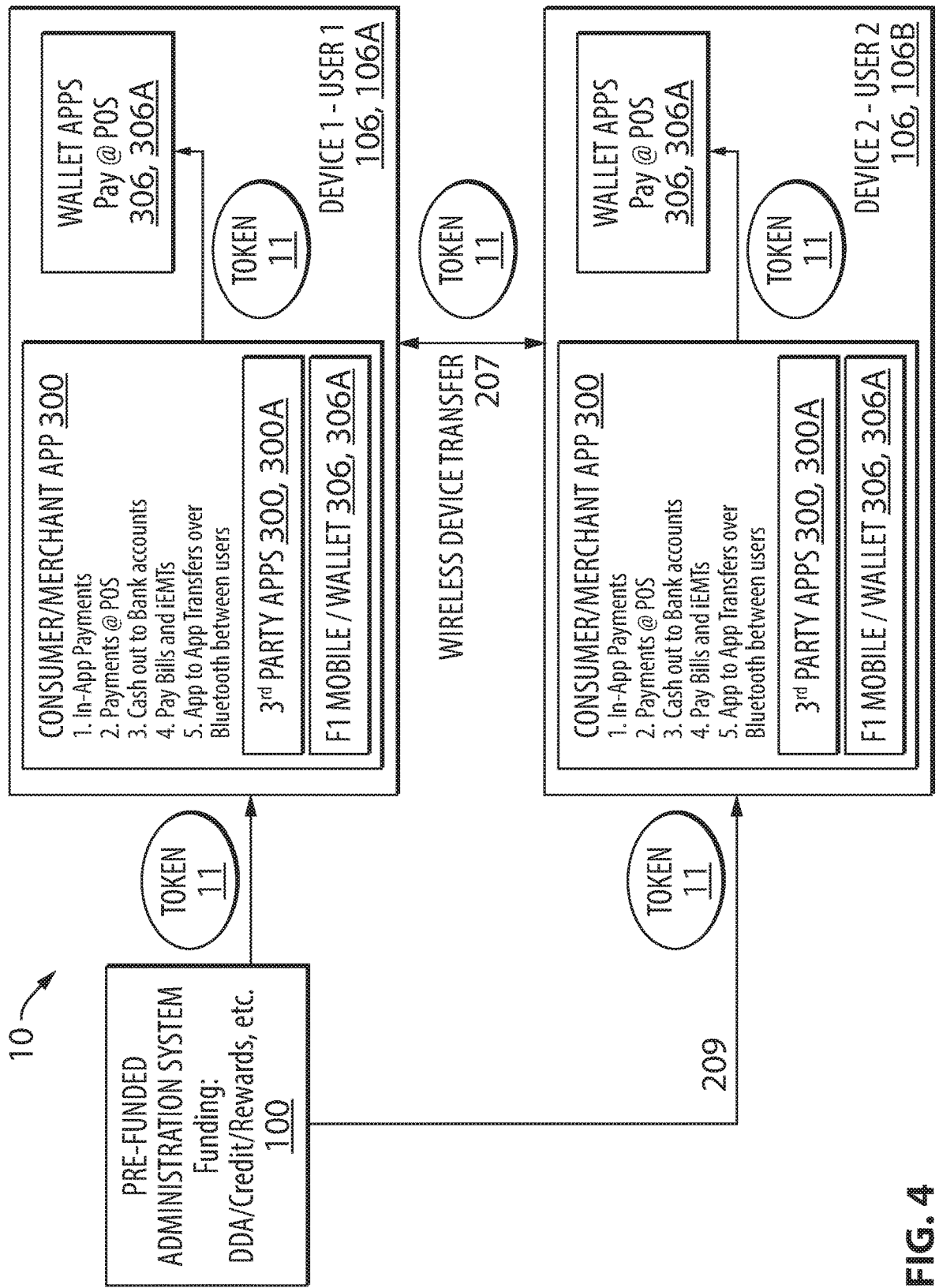
FIGS. 4-5B are schematic diagrams illustrating embodiments of process flows useful in generating pre-funded token data sets and effecting pre-funded payment transactions in accordance with the disclosure.

Generation (i.e., creation) of a pre-funded or otherwise pre-authorized payment token may, in accordance with the disclosure, be initiated by the first user 104 through authentication processes 206 by, for example, invoking a suitably-configured wallet application on the user's device 106A (e.g., application(s) 300, 306 in FIG. 4), and through such application communicating with an pre-funded token administration system 100, such as a bank or other financial institution (FI). Any one or more suitable sources of funds or other value, including for example one or more user-selected, pre-existing tokens stored on the device 106A and/or in secure memory associated with a user's FI system 100, or a user's debit, credit, reward, or other value account administered by a bank or other FI 100, 101 may be selected by the user or otherwise identified as a source of the funding for the prefunded token to be generated. Once generated, the prefunded token can, for example, be activated (e.g., rendered negotiable) as soon as the first user 104 has completed the process of generating it, and at 207 can thereafter be communicated to a second device 106B associated with a desired second user 105. In such cases, once the second user 105's device 106B has received the token, or a pointer such as a hypertext link to an address associated with a token stored in an administration system 100, 101 in order to deposit the token into an account or other memory associated with the user 106B, the token can already be activated. Thus, for example, in many embodiments clicking on an associated link to enter a personal identifier such as a PIN, biometric information, or other secure identifier, or otherwise depositing or processing the token, is not required for token activation.

Thus, for example, in various aspects and embodiments systems, devices and methods in accordance with the disclosure can be used to create negotiable prefunded token data sets, comprising secure data items or records representing negotiable monetary or other economic value, and to share them between network communication devices such as smart phones, home or business desktop computers, etc., for use in purchases and other transactions conducted with merchant systems 102, etc.

Such prefunded payment tokens can be generated and processed in accordance with any suitable protocols or format(s), including for example data sets representing or otherwise identifying cryptocurrencies and/or other virtual currencies or coinages. Such protocols include, for example, any of the currently-prominent payment protocols, such as Visa®, Mastercard®, EuroPay®, Apple Pay, etc. Moreover, such tokens can be adapted for processing in any desired form(s) of transactions, including for example any or all of peer-to-peer (P2P), customer-to-business (C2B), and on a user's own behalf (Me2Me). Moreover, such transactions can, be processed using any desired type(s) of digital asset and payment systems, including processes that involve verification through the use of network nodes, and recordation or accounting in one or more virtual, optionally publicly-distributed legers such as block chains.

For example, as shown in FIG. 4 et seq. and further explained below, using a merchant or other consumer transaction application 300, and/or a virtual wallet application 306, on a data communication device 106, 106A, a first user 104 can cause his/her device 106A to request generation or other acquisition of a pre-funded token data set 11 representing a desired negotiable value in virtual currency, and store it for immediate or future use in a virtual wallet application 306A or other secure memory 306 of the device 106, 106A. Among the particular advantages offered by the various aspects of the invention, the user 104 can, optionally, add additional authorized transaction value to the token data set at any desired time. Any such additional authorized transaction value may be funded by any resources controlled by such user 104/device 106A, including for example any debit, credit, loyalty, or rewards accounts administered on the user's behalf by a token administration system 100 or other account administration or FI system(s) 101.

Having caused generation of or otherwise acquired a pre-funded token, the user 104 can use the token him/herself as full or partial consideration in a purchase or other transaction; or, as shown at 207, he can transfer it to another user 105 such as a friend, relative, colleague or business partner, for immediate use by the second user 105 in a payment or other transaction, or for storage by the second user 105 in secure memory controlled or otherwise accessible by the second user's device 106B, for use in a future transaction, or for transfer to a third or further user (not shown) for use, storage, or transfer by such further user, as desired. Alternatively, a user 104 can cause a pre-funded token to be generated or otherwise processed by an account administration system 100 and transferred directly to a second user's device 106B, as shown at 209.

Among further significant advantages offered by the invention is the ability to enable a user 104 of a first device 106A to transfer pre-funded tokens to one or more second users 105/device 106B. This can be accomplished by any suitable means, preferably including encrypted or otherwise secure wireless communications. Such means can, for example, include social networks or other social media; NFC, RFID, Bluetooth low energy (BLC), AirPlay™, protocols, etc.

In various aspects and embodiments of the invention a user 104, 105 wishing to tender a pre-funded token in accordance with the disclosure as full or partial consideration in the completion of a payment or other transaction can present the token for payment in a very wide variety of ways. For example, remote transactions can be conducted using the internet, POS payments can be made using NFC and/or tap technologies, or by automated banking and/or payment process, including for example period bill payments, etc.

Secure data sets useable as pre-funded or otherwise pre-authorized tokens in accordance with the invention can comprise any one or more data items, or records, consistent with purposes disclosed or suggested herein. For example, a pre-funded token data set 11 in accordance with the disclosure can comprise a plurality of associated data items formatted in accordance with a desired transaction processing protocol and representing any or all of the following:

<security key information><protocol identifier (e.g., EMV, Mastercard, Apple Pay™><pre-authorized transaction value><funding account or source identifier(s)> <merchant category and/or name><type code (transferable/not transferable)><transferee address information><personalized (photo or greeting) content><expiration date/time>

As will be appreciated by those skilled in the relevant arts, the content and formatting, or protocol, to be used in generating a pre-funded token data set 11 can vary depending upon a wide variety of factors, including transaction execution protocols to be used in processing of the token, options selected by the generating user 104, (e.g., a gift card token, a bill payment token, etc.); moreover, as previously noted the token can be formatted, at the time of generation, and/or reformatted later, according to any desired protocol (s), so that the token can by interpreted, stored, retrieved, tendered, and otherwise processed by any desired payment, storage, or processing applications or devices, including virtual wallets or other applications provided by or otherwise associated with various merchants, FIs, etc. The embodiment shown above, which can comprise personalized content representing photos or other images, messages and transferee address information (e.g., e-mail or telephone/text number), etc., is suitable for use for a gift card token transfer data set.

In various aspects and embodiments, the invention enables a very wide variety of processes useful for creating (generating), managing, transferring (moving or sharing), and redeeming (using as consideration in purchase and other types of transactions).

For example, as shown in FIG. 1, processes for generating tokens can comprise some or all of the following steps:

At 206 in FIG. 1, for example, a user 104 of a network or data communication device 106A can establish a secure communication session with a pre-funded token administration system 100, for example a token-issuing bank or other FI 100 which administers or otherwise controls one or more credit, debit, loyalty, or other value accounts associated with the user 104 such that they may be used as token funding sources, by, for example logging into an online banking (OLB) service through a consumer/merchant app 300 or a virtual wallet application 306, and providing suitable credentials. The user 104 can, for example, access either or both of a consumer or merchant shopping/transaction application 300 and a virtual wallet application 306, as shown in FIG. 2, and by using one or more input/output devices such as a touchscreen device, navigate suitably-configured options to communicatively connect to the administration system 100 via the internet or other network.

As will be understood by those skilled in the relevant arts, an "application" or "app" as used herein means a programming or other instruction set embodied in software, firmware, or hardware operable by a CPU 602, typically under the control of an operating system as shown in FIG. 3.

Having established a secure communication session, at the user 104 can initialize or otherwise invoke a token registration and/or activation process, and designate one or more accounts (such as user bank, credit, or loyalty accounts) to serve as sources of funds to be associated with the token for use in a payment transaction, along with one or more amounts from each such account to be so used. Among the advantages offered by the invention is the ability to use multiple accounts, and multiple types of accounts (e.g., credit, debit, loyalty, rewards) to fund a single payment. As previously noted, previously-generated payment tokens can also be used to fund pre-funded tokens in accordance with the invention, by for example simply reformatting and authorizing them, adding them to other forms of stored value, etc., and executing any suitable accounting and reconciliation processes to properly track and account the use of monetary value.

In addition, any suitable or otherwise desired type(s) of security/fraud protection process(es) may be applied, to ensure the security and reliability of generated tokens.

As a further option, one or more expiration dates and/or times may be associated with the token, so that after a given amount of time has elapsed, or after a predetermined date and/or time has passed, a token may be temporarily or permanently and wholly or partially disabled.

As previously noted and explained below, as a further option, one or more existing tokens may be combined, or otherwise used, to fund generation of one or more pre-funded tokens in accordance with the invention.

Figure 5A:
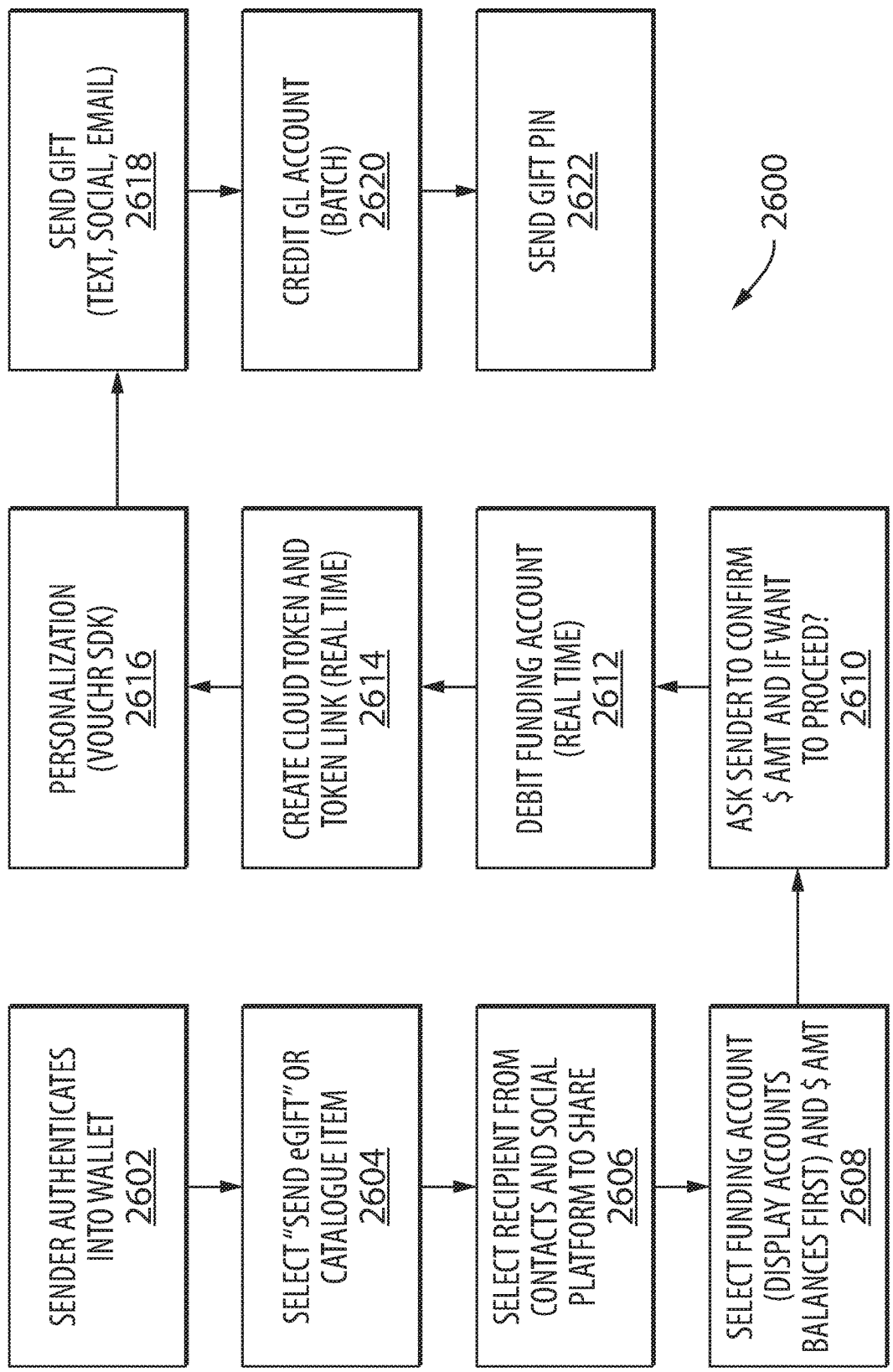
FIG. 5C is a schematic diagram illustrating embodiments of user interfaces useful in generating pre-funded token data sets and effecting pre-funded payment transactions in accordance with the disclosure.
Figure 5B:
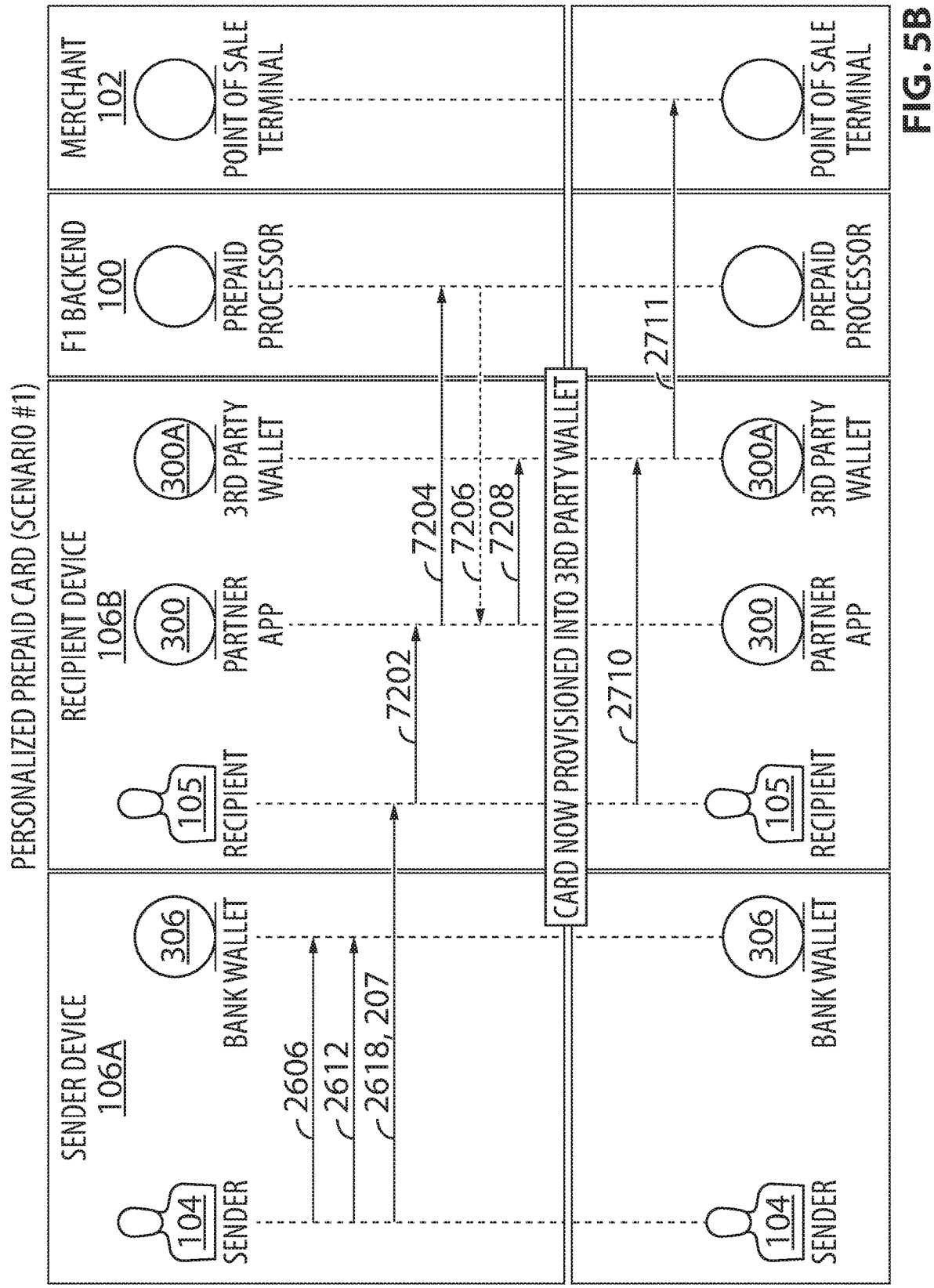
Figure 5C:
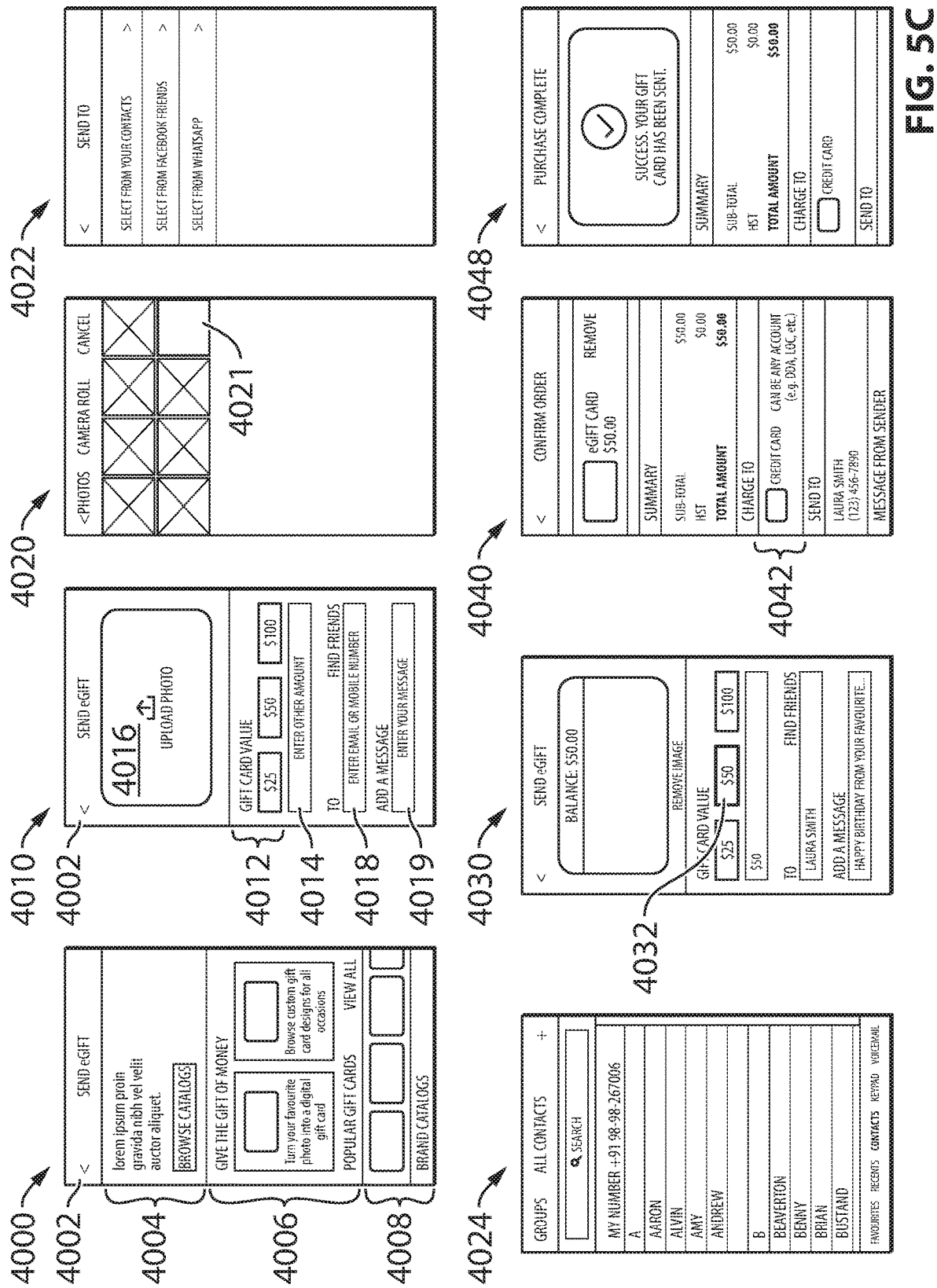

An embodiment of a process 2000 for generation of a pre-funded token by a first user 104 of a device 106, 106A, and transfer of the generated token to a second device 1066 associated with a second user 105, as a gift to the second user, is shown in FIGS. 5A-5C, and can be described and understood through further reference to FIGS. 1,2, and 4.

In the embodiment shown in FIG. 5A, a (sub)process 206 of generating the token can begin at 206, 2602 with invocation by the user 104 of a wallet or other payment application 300, 306. For example, the user 104 can use a touchscreen and/or one or more other input/output components 610 to access a virtual wallet application 306 associated with his/her bank; alternatively the user can access merchant/consumer application such as a merchant's website system 102, or an application stored on the user's device 106A for secure communicaton with a merchant transaction system 102. Such processes can include entry by the user 104 of secure identifiers such as one or more PINs, biometric data, etc.

Invocation of a suitably-configured application can enable the user 104 to use his/her device 106A to enter or otherwise designate data items or data sets useable by the application 300, 306 in generating a pre-funded token request data set, to be routed for example to an issuing FI 100 for adjudication and approval, and for generation and return of a pre-funded token data set 11 as, for example, described above.

Having invoked the wallet or other payment application 300, 306, at 2604 the user 104 can initiate a pre-funded token generation gift process by for example selecting a suitably-configured application icon 'send eGift' displayed on a suitably-configured user interface screen generated by the wallet or payment application 300, 306 (not shown). Selection of such an icon can place the wallet or transaction application 300, 306 into a state suitable for generation of a pre-funded token request data set comprising a type code or identifier indicating that the token is to represent a gift card data set, for transfer to a second party 105 as shown above.

In such a case, at 2604 invocation of a 'send eGift' process by selection of such a corresponding display icon within the virtual wallet or merchant app 300, 306 can result in generation of an interactive catalog or list display 4000 such as that shown in the first (top left) of the eight interface screens shown in FIG. 5C, for capture or designation of further relevant data. As a next step, still at 2604 in FIG. 5A, the user 104 can select any of catalog items 4004, to elect to browse the same or another a virtual catalog of goods and services and generate a pre-funded token representing payment for one or more particular items and/or services; an item 4006, to elect to generate one or more pre-funded tokens representing a monetary value to be used as whole or partial payment for a transaction; or an item 4008 to generate one or more pre-funded tokens representing a real or virtual gift card. As will be appreciated by those skilled in the relevant arts, once they have been made familiar with this disclosure, a wide variety of further options for types of pre-funded tokens may be provided in an interface screen 4000; each can be associated with the generation of one or more distinct types of token data sets.

At 2606, the user 104 can designate a recipient for a pre-funded token by using a command sequence adapted to enable the user 104 to select the recipient, and thereby identify a transferee address information data item, from a convenient, pre-existing list in a contacts folder, or through a wide variety of social platforms. For example, selection of an item 4008 in FIG. 5C can cause generation of an interactive user display 4010 such as that shown in the second panel of FIG. 5C, which is useful for generating a physical or virtual gift card or gift personalization data set.

By selecting one of the pre-set gift values 4012 or entry of another preferred amount in input field 4014, the user 104 can specify a desired pre-funded transaction value amount to be used in generating the prefunded token, and identify one or more funding sources, such as demand or credit accounts, rewards or other value accounts, etc., administered by one or more of systems 100, 101.

For use in association with transfer of a token which is to be transferred as a gift or other greeting, the user 104 can also select an item 4016 to identify a data set representing a photo, message, or other information to be associated with a pre-funded gift personalization data set. A text message to be associated with the gift card data set can be provided for the personalization data through use of interactive input field 4019, and at 4018 a virtual address, telephone number, and or other network address can be provided for identifying a desired recipient 105 and forwarding the pre-funded token data set 11 to the desired recipient.

At 2606, and as shown at 4020, selection of item 4016 from display 4010 can invoke a camera 610 or photo album application 300 or other data set or application (which may be entirely separate from wallet or transaction applications 300, 306) to be used in generating a photo or other image to be included with personalized data to be used in generating the pre-funded token request data set, or forwarded by means of a separate data set, so that the prefunded token transfer data set, if approved, set can be personalized by use of desired photo and/or greeting content. Moreover, as shown at 4022, 4024, data useful for generating a transferee address information data set for forwarding or otherwise transferring a generated pre-funded token to a desired recipient 105/recipient device 106B can be provided by use of an interactive list providing a wide variety of options, including the ability to select suitable information from a contacts folder, from social media ("Facebook Friends"), and/or a distinct communications application (e.g., "WhatsApp"). For example, a suitable command icon 4018 in an application 300, 306 can enable the application to access a contacts application on the user's device 106, and display a list thereof; selection of a contact "Laura Smith" from a contacts list such as that shown in display 4024, and/or photo item 4021 can cause corresponding transferee address data to be added to the pre-funded token data transfer set.

With an addressee and any desired personalized content designated, and suitable data items generated for inclusion in the pre-funded token request data set, and/or in a corresponding gift or transfer or delivery notification data set, at 2608 the user 104 can be prompted or otherwise enabled to designate one or more funding accounts for further use in generating the pre-funded token request data set. For example, upon designation of a desired recipient's network address, the user 104's device 106A can be configured to display a screen 4030 comprising variety of items 4012 to designate a desired pre-authorized transaction value to be associated with the pre-funded token request data set, as well as data items 4021' and 4024' confirming previous selections. Selection of a "$50" item 4032 in display 4030 of FIG. 5C, for example, can cause the user's device 106A to generate a pre-funded value authorization request data set, to be routed to an account administration system 100 associated with one or more eligible payment funding accounts. System 100 can return a set of account identifiers to be used in populating a list 4042 to be presented for selection/confirmation by the user 104, as shown at 4040.

With all required and otherwise desired information designated, at 2610 the user 104's device 106 can cause a negotiable pre-funded token request data set to be generated. Optionally any or all of the designated information can be displayed on a device 610, display 4040, along with any data generated or retrieved by the token request application 300, 306, for confirmation by the user 104, prior to routing of the request to an authorized pre-funded token administration system 100 for adjudication and issuance of the pre-paid token. For example, a user's merchant/consumer app 300, and/or virtual wallet application 306 can assemble designated information and generate a pre-funded token request data set comprising some or all of the following data items:
<type code><requested pre-funded negotiable amount>
<funding account or source identifier(s)><transferability request>
<recipient (transferee) address information>
<personalized (photo and/or greeting) content>
<currency><security key information><protocol identifier (e.g., EMV, Mastercard, Apple Pay™)><time/date stamp><merchant or product restriction(s)>

Where:
<type code>—e.g., gift, transaction payment, loan, etc.
<requested pre-funded negotiable amount>=requested token value; may be in a default currency, e.g., associated with one or more funding sources, or a currency designated by the requesting user 104
<funding account or source identifier(s)>=funding source account number(s), token identifiers, etc.
<transferability request>=flag for transfer to specific individuals, entities, or classes or types of individuals or entities
<recipient (transferee) address information>=recipient network address information, or reference thereto
<personalized (photo and/or greeting) content>

Unless explicitly designated by the user 104, the following data items may be retrieved from appropriate memory and/or generated by the user's app 300, 306, or supplied by the token generator system 100 during the adjudication and issue process:
<currency><security key information><protocol identifier>
<time/date stamp><merchant or product restriction(s)>

Where:
<currency>=the currency type to be represented by the pre-funded token, e.g., US or Canadian dollars, British pounds, Euros, Yen, etc., and/or virtual currency type, e.g. bitcoin, etc. May or may not be the currency type(s) used to fund the token.
<security key information>=PKI information or other encryption data, etc.
<protocol identifier>=payment processing protocol, e.g. (e.g., EMV, Mastercard, ApplePay™, etc.
<time/date stamp>=date and/or time of generation or routing of request data set
<merchant or product restriction(s)>=merchant ID for payment, e.g. a URL or account number associated with the merchant, or if the token is a personalized gift token designating a specific item, such as cell phone, camera, baseball glove, or automobile, or if the type is a reward redemption or payment, then the token can be restricted to payment to a specific set of merchants or merchant system(s) 102; and/or to a type of product, identified for example by a product code, such as a baseball glove, haircut, spa treatment, etc. Alternatively, or in addition, such restrictions can be applied to one or more businesses within a designated geographic area or location, or can limit the token to use in transactions processed according to one or more payment protocols.

It is important to note that data sets described throughout this disclosure can be formatted according to any suitable protocol or method, depending on the purpose to which payment systems according to the invention are to be put, and the convenience of the various stakeholder parties, including any or all of entities 106, 100, 101, 102, 108, etc.

For example, any one or more of the data items described above can be coded separately or in combination. For example, <issuing token administrator/payment authorization code> and/or <authorization key> items may be generated and otherwise processed as distinct data items or as single codes carrying information relating to both purposes. For example, a number or character string can be adapted so that a single 8-16 digit number identifies both the issuing token administrator and a flag or other code indicating an authorization type (e.g., fully negotiable or subject to confirmation prior to approval of a requested transaction.)

For example, such a combined code can be placed into a Bank Identification Number (BIN) and formatted accordingly, depending upon the desired protocols. Alternatively, or in addition, such information can be coded into a string carried in a discretionary data field of a payment or transaction protocol such as EMV or Apple Pay. In a somewhat crude example, of the use of such a field can comprise use of the following bits:

<BIN/AC>

Where:

BIN=a bank account or GL account identifier

AC=authorization code type, e.g., NG for 'fully negotiable' or CR for "confirmation required".

As will be understood by those skilled in the relevant arts, once they have been made familiar with this disclosure, the example above is simple one relatively simple example of the manner in which a discretionary field provided in a payment protocol can be used to implement various combined or distinct data parameters. A wide variety of other formats are possible Thus, at 2610 a confirmation screen 4050 can be generated and displayed for the user 104. Optionally, confirmation by the generating user 104/device 106A may be required prior to creation of the token request data set. This can be particularly advantageous where pre-funded tokens, once generated, are not refundable except optionally though separate re-deposit procedures at the issuing or responsible account administrator 100. Optionally, any or all of visual, e-mail, text, or other confirmation messages may generated for display and/or routing the generating user 104.

At 2612, the optionally-confirmed, negotiable pre-funded token request data set can be routed to a token administration system 100 for adjudication and, conditioned on availability of funds, compliance with regulatory or legal requirements, etc., generation of a negotiable pre-funded token data set 11.

Adjudication of a pre-funded token request by a token administration system 100 can, for example, include accessing data related to the requesting user 104, an intended recipient 105, the proposed funding account(s) or source(s), any proposed merchant restrictions, and/or any of the other data items associated with a request, to determine whether a negotiable pre-funded token should be generated and/or otherwise authorized. For example, adjudication of a request can include any or all of determining whether adequate funding sources exist to cover the requested amount (e.g., whether demand, credit, and/or rewards funds of sufficient amounts exist and are available for the purpose of funding the requested token); whether any regulatory or other restrictions apply to any of the requesting user, an intended recipient, or a proposed merchant or class of merchants; whether any promotions associated with the user, the recipient, any merchants, the token administrator, the proposed currency (e.g., cross border transfers of various currencies) and/or any related FIs might apply, such as discounts, coupons, or special offers.

If a pre-funded token request is approved, then at or near the time of authorization, or at any other desired time, the requesting user 104's funding source(s) can be debited or otherwise charged. For example, demand deposit accounts can be debited, charges added to lines or credit or other credit accounts, and/or rewards points can be redeemed.

At 2614, conditioned upon tender to the token administrator 100 or designated FI 101 of adequate funding sources, a (negotiable) pre-funded token can be issued. As shown at 206 in FIG. 1, a negotiable pre-funded token data set 11 may be routed back to the requesting user 104's data communication system 106A; alternatively the token may be routed for secure, remote storage in the cloud, for forwarding subject to a later authorized request.

A negotiable pre-funded token data set 11 in accordance with such embodiments of the invention can comprise some or all of the following data items:

<security key><type code><currency><pre-funded negotiable amount>

<issuing token administrator/payment authorization code><pre-funded authorization key><transferability indicator><protocol identifier><authorized recipient information>

<funding source identifier(s)><personalized information>

<personalized (photo and/or greeting) content>

<time/date stamp><expiration date/time><merchant restriction or product(s)>

Where:

<security key>=PKI or other security key for decryption, etc.

<type code>—e.g., gift, transaction payment, loan, etc.

<currency>=the authorized currency associated with the pre-funded negotiable amount <pre-funded negotiable amount>=authorized token value <issuing token administrator/payment authorization code>=e.g., bank identification number (BIN) of bank issuing the token, or other entity underwriting payment on the token, and/or authorization for the pre-funded token to be processed as fully negotiable upon presentment, for an amount not exceeding the pre-funded negotiable amount <funding account or source identifier(s)>=funding source account number(s), requesting user 104 identifiers, etc. This identifier can be securely stored as part of the token, for use in connection with refunds, voids, etc.; optionally not shared with recipient 105

<transferability indicator>=data corresponding to an authorization for transfer of at least a portion of the value of the pre-funded token to a recipient or second data communication device <recipient (transferee) address information>=recipient network address information, or reference thereto, etc.

<personalized (photo and/or greeting) content>

<protocol identifier>=payment processing protocol, optionally may be over-ridden by authorized user 104, 105, merchant 102, or FI 100, 101

<time/date stamp>=date and/or time of generation or routing of pre-funded token data set <expiration date/time>=date and/or time of expiration of negotiable status of the pre-funded token data set, so that for example use of the token as satisfaction in a payment transaction is subject to re-authorization; or expiration of transferable status or any other characteristic of the token <merchant or product restriction(s)>=merchant ID for payment, account number, URL, or other network address, or, e.g., if the token is a personalized gift token designating a specific item, such as cell phone, camera, baseball glove, or automobile, or if the type is a reward redemption or payment, then the token can be restricted to payment to a specific set of merchants or merchant system(s) 102; and/or to a type of product, identified for example by a product code, such as a baseball glove, haircut, spa treatment, etc. Alternatively, or in addition, such restrictions can be applied to one or more businesses within a designated geographic area or location, or can limit the token to use in transactions processed according to one or more payment protocols.

One of the many significant improvements enabled by the invention is enablement of the immediate, negotiable issue of a pre-funded token, in real time, as soon as the first user 105 has completed the generating and/or request process 2602-2610 and corresponding processing by system 100 can be completed. By the time a second user 105 has received the token, or a link to deposit the token, or other notification, in other words, the token can already be activated. Clicking on a link, depositing the token, entering a PIN, etc., need not be required for token activation. Thus, such a negotiable token can be exempted from later authorization, so long as any desired conditions are satisfied. Among other things, this can enable such a token to be presented for payment, or redeemed, even when communications with the issuing system 100 and/or any other FIs 101 or transaction processing systems 108 are not available.

Thus, for example, the invention enables data communication devices 106 to route the secure negotiable pre-funded token transfer data set to network addresses associated with recipients 105, 102, etc., in ways that exclude routing them via third party payment processors 108.

As previously noted, a negotiable pre-funded token data set may be funded using a plurality of funding sources. In such cases it may be necessary of desirable to implement separate (partial) payment processes 2608-2612 for each designated funding source.

Optionally, at 2614, a negotiable pre-funded token data set may be forwarded to any or all of systems 100, 102, 108 for remote ("cloud") storage, as a backup or alternative to storage on the generator's or recipient's devices 106A, 106B.

At 2616, any further or previously-uncompleted personalization of the pre-funded token data set may be accomplished. For example, in many embodiments it may not be necessary or desirable to route personalization data, such as recipient identifiers, personalized photo or message data, etc., to a token administration system 100 in conjunction with a request for issuance of a pre-funded token; in such cases the token adjudication/authorization processes and personalization processes may be partially or complete bifurcated. In such cases personalization processes like those described at 2604-2608 may be implemented, or partially-complete processes completed at 2616.

It will also be appreciated by those skilled in the relevant arts that processes of transferring tokens from sender devices 106A to recipient devices 106B can be configured so that transferred pre-funding token data sets 11 are formatted according to any desired protocols, including payment protocols and virtual wallet protocols. For example, a token data set 11 transferred from a device 106A to a device 106B can be formatted in accordance with a virtual wallet application 306 associated with the first user 104/106A, the second user 105/106B, or both.

At 206, 2618, the pre-funded token data set 11 can be forwarded to the requesting device 106A, for example if storage in a cloud memory of systems 100, 101 is not preferred.

In some embodiments of the invention, negotiable pre-funded token data sets 11 can be implemented through the use of unique, optionally single- or multiple-use dedicated ledger accounts (e.g., any account established and maintained on a general ledger (GL) account). For example, a one-time use token can be assigned a demand deposit account number (BIN) on a GL by an originating administrator 100, 101. In such embodiments, the GL account can be credited at the time generation of the pre-funded token is authorized, as shown at 2620. In such embodiments, as explained further below, the GL account can be debited at a time when the token is used in full or partial satisfaction of a payment transaction.

In embodiments were a pre-funded token is re-usable, either for example through the use of partial payments accounting for less than the full value of the pre-funded negotiable amount associated with the token, or where such tokens can be assigned additional funds after the original generation or issuance, the associated special-purpose GL account can be credited and/or debited as payments are made or deposits received by a funding administrator 100, 101.

In various embodiments of the invention, particularly where a negotiable pre-funded token data set 11 is to be transferred from one user 104 to a second user 105, at 2622 a token administration system 100 can generate verification data such as a PIN or other security code string, for use by a recipient 105 in accessing the pre-funded token for deposit, tender during a transaction etc., and can include the verification data in a separate communication routed to the generating device 106A, the recipient device 106b, or any third party system 100, 101, 102, etc., for later transfer to the recipient device 106b by e-mail, social media or text message, etc.

Thus, for example, the invention provides data communication devices 106, and related methods and transient and/or non-transient machine-interpretable programming and/or other instruction products useful for the generation, transfer, storage, and other processing of secure data sets used in electronic payment transactions. Such a device 106 can, for example, comprise one or more user input devices 610, such as touchscreens, keypads, and pointing devices; one or more short-range, network, and/or other data communication systems 612, 614; one or more CPUs and/or other data processors 602; and persistent memory device(s) 606 comprising stored, machine-interpretable instructions adapted to cause the at least one data processor, in accordance with instructions generated by the at least one user input device 610, generate a pre-funded token request data set, the pre-funded token request data set comprising data representing at least an identifier associated with a pre-funded token funding source and a requested pre-funded negotiable amount. The device can further be configured, for example through the use of suitably-adapted instruction sets, to route such pre-funded token request data sets to one or more pre-funded token administration systems through the use of communication system(s) 612 and/or 614 and, using the same or other data communication system(s), receive from the pre-funded token administration system(s) 100 negotiable pre-funded token data sets, each negotiable pre-funded token data set comprising data representing at least a pre-funded negotiable amount and a negotiable pre-funded payment authorization. In such contexts, 'negotiable' means, for example, that the token, one issued by the administrator 100 and/or presented for payment to a payee device 102, cannot be recalled or payment otherwise denied.

As described above, such pre-funded token data sets can further comprise any or all of currency identifiers indicating which currencies the pre-funded amounts are payable in; a date and/or time associated with authorization of the pre-funded negotiable amount; and/or a date and/or time associated with expiration of negotiability of at least a portion of the pre-funded negotiable amount.

Alternatively, or in addition, such a pre-funded token data set can comprise data corresponding to authorization for transfer of a pre-funded token data set corresponding to at least a portion of the pre-funded negotiable amount to memory of a second data communication device 106, 106B. As will be understood by those skilled in the relevant arts, once they have been made familiar with this disclosure, any one or more of the data items associated with a pre-funded token data set can be include, or be interpreted or otherwise used as, an authorization code, so that the token data set can be regarded as negotiable. For example, such authority can be coded into or otherwise associated with a dedicated authorization data item, or it can be coded into a type code, issuing BIN, funding source account number, etc. For example, a unique BIN or class of BINs can be used, with some or all of the digits indicating that the token is pre-funded and therefore may be considered negotiable.

At 207 in FIG. 1, 2618 in FIGS. 5A, 5B, a process of transferring a a negotiable pre-funded token data set 11 to a desired recipient 105, 106B, in accordance with transferee address information associated with the pre-funded token data set can be implemented.

For example, with reference to FIGS. 1 and 4, a user 104 of a device 106A, having acquired a negotiable pre-funded token data set 11, or control thereof, and wishing to transfer the possession, ownership, and/or control of the token to a recipient 105, 106B, can use a touchscreen and/or other input-output device 610 to access the pre-funded token data set 11. For example, as described above the user 104 can use the touchscreen 610 to invoke a virtual wallet application 306 provided by or otherwise associated with the user's bank or other FI 100, 101, and/or or a shopping or other application 300 provided by or otherwise associated with one or more merchants, and navigate to a suitably-adapted user interface in order to access a token data set comprising at least a pre-funded negotiable amount and a negotiable pre-funded payment authorization, and to generate signals representing an instruction to transfer the token data set, and/or a pointer to an address associated with the token data set, e.g., where the token data set is stored in secure memory associated with an administration system 100, 101.

Using any or all of the processes described above, for example with reference to process steps 2606 described above, the user 104 can use the touchscreen and/or other input/output device 610 to generate a secure negotiable pre-funded token transfer data set, the at least one secure negotiable pre-funded token transfer data set comprising data identifying at least one pre-funded token transfer recipient 105, the same or another negotiable pre-funded payment authorization comprised by the pre-funded token data set 11, and at least one negotiable pre-funded token transfer amount. Such amount can, for example, be the same as or less than the pre-funded amount associated with the accessed token data set 11. For example, as described above, the user 104 can use one or more apps 300, 306, in conjunction with any contact-management applications, etc., to navigate to a GUI adapted to allow the user 104 to select or otherwise designate a recipient 105.

As previously noted, and as will be understood by those skilled in the relevant arts, once they have been made familiar with this disclosure, a recipient 105 can be any individual or entity, or representative thereof, having any interest in receipt of a pre-funded token 105, or a network address (e.g., e-mail address, telephone number, etc.). Alternatively, or in addition, a recipient 105 can be a specific data communication device 106B, or a network address associated with any of the foregoing.

In addition to identifiers associated with the intended recipient 105, 106B, pre-funded token data set 11, and transfer amount, the pre-funded funded token transfer data set can include data representing any personalized greetings, instructions, gift and/or product descriptions, images, and/or other personalized content the transferring user 104 desires to associate with the transferred token. Such content can, for example, be generated using processes 2604, 2606, 2616 described above. Moreover, such personalization data may have been generated or otherwise designated in advance, and associated with the token transfer request data set already, or may be associated therewith at the time of transfer.

Thus, a secure negotiable pre-funded token transfer data set in accordance with such aspects of the invention can comprise some or all of the following data items:

<security key><type code><currency><negotiable pre-funded transfer amount>
<issuing token administrator/payment authorization code><pre-funded authorization key><transferability indicator><protocol identifier><authorized recipient information>
<funding source identifier(s)><personalized information>
<personalized (photo and/or greeting) content>
<time/date stamp><expiration date/time><merchant restriction or product(s)>

Where:
<security key>=PKI or other security key for decryption, etc.
<type code>—e.g., gift, transaction payment, loan, etc.
<currency>=the authorized currency associated with the pre-funded negotiable amount
<pre-funded negotiable amount>=authorized token value
<issuing token administrator/payment authorization code>=e.g., bank identification number (BIN) of bank issuing the token, or other entity underwriting payment on the token, and/or authorization for the pre-funded token to be processed as fully negotiable upon presentment, for an amount not exceeding the pre-funded negotiable amount
<funding account or source identifier(s)>=funding source account number(s), requesting user 104 identifiers, etc. This identifier can be securely stored as part of the token, for use in connection with refunds, voids, etc.; optionally not shared with recipient 105 or included in the pre-funded token transfer data set
<transferability indicator>=data confirming an authorization for transfer of at least a portion of the value of the pre-funded token to a recipient or second data communication device
<recipient (transferee) address information>=recipient network address information, or reference thereto, etc.
<personalized (photo and/or greeting) content>=images, text, instructions, verification data and/or instructions, etc.
<protocol identifier>=payment processing protocol, optionally may be over-ridden by authorized user 104, 105, merchant 102, or FI 100, 101
<time/date stamp>=date and/or time of generation or routing of pre-funded token data set
<expiration date/time>=date and/or time of expiration of negotiable status of the pre-funded token data set, so that for example use of the token as satisfaction in a payment transaction is subject to re-authorization; or expiration of transferable status or any other characteristic of the token
<merchant or product restriction(s)>=merchant ID(s) or criteria, or specific product information, as described above.

Having generated the pre-funded token transfer data set, at 2618, 207 the transferring user 104 can use the same or another input/output device 610 of his/her data communication device 106A and the recipient (transferee) address information to route the transferred token, or a reference to a remotely-stored token, to a network address associated with the at least one pre-funded token transfer recipient, via one or more of the data communication systems 612, 614 of the device 106A.

As previously noted, the pre-funded token transfer data set transferred at 207, 2618 can comprise a data item representing the negotiable pre-funded amount, and/or it can comprise a reference to such a data item where, for example, the actual negotiable data item is stored in secure memory of an administration system 100, 101 in the cloud. In such cases, one or more identifiers identifying one or more authorized users 104, 105 of the token, i.e., individuals or entities authorized to expend funds associated with the pre-funded authorization, can be changed in order to update the identity(ies) of those individuals or entities who are authorized to spend the funds in a transaction.

Optionally, as previously explained, a transfer conducted at 207, 2618 can be made subject to advance or real-time authorization by the administration system 100, 101 that authorized or has legal control of the pre-funded token data set 11. Such authorization, if granted in advance, can be indicated by use of the above-mentioned transferability indicator data embedded within or otherwise associated with the token data set 11. The existence and/or applicability of such transfer authorizations can be confirmed prior to transfer by operation of a virtual wallet or merchant/consumer application 300, 306 running wholly or partially on the transferring user's device 106A. Thus, for example, either or both of generating a token transfer data set and routing of the token to the recipient at 207, 2618 can be conditioned upon data indicating that at least a portion of the pre-funded negotiable amount is transferable.

As explained above, a secure negotiable pre-funded token transfer data set in accordance with such aspects of the invention can comprise one or more one gift personalization data sets, which can include data representing one or more images, and/or text such as greeting, instructions, conditions imposed or proposed by the transferring user 104, verification data including questions and answers to personal information, PIN information, etc. In such cases, 'representing' can mean that data included in the token transfer data set is interpretable as image or text data, or comprises one or more references to such data, with the actual image and/or text data, or some portion(s) thereof, being stored remotely on some other device, and accessible by either or both of the devices 106A, 1066 remotely.

As previously discussed, personalization data content such as images, greetings, instructions, and references to verification data and/or processes, and/or references to such information, can be routed from a transferring user 104 to a recipient 105, 1066 at 20, 2618 as part of a negotiable pre-funded data set, or at 2618, 2622 as part of one or more separate communications. In the latter case, a secure pre-funded token data set 11 can be routed from the sending device 106A, or from a remote secure storage associated with an administration system 100, 101, to the recipient 105, 1066, and a separate transfer notification data set can be routed by the same or other means. In such instances, for example, the secure token data set 11 can be routed via one or more of applications 300, 306, and/or administrators 100, 101, while a separate notification message is sent via the same or other applications 300, 306, or by a separate e-mail, text message, or other communications application.

In such cases, the token-sending data communication device 106A can be adapted to use at least one data communication system 612, 614 to route to at least one network address associated with the at least one pre-funded token transfer recipient 105, 106B a pre-funded token delivery notification data set, the pre-funded token delivery notification data set comprising at least data useful for causing a display 610 of a second data communication device 106B to display a notification receipt message confirming receipt by the device 106B of a negotiable pre-funded token data set.

Examples of processing of a transferred pre-funded token data set 11 by a recipient 105, 106B can be described by reference to process step 2618 in FIGS. 5A and 5B, and FIGS. 6A and 6B, with further reference to FIGS. 1, 2 and 4.

At 2622, as previously mentioned, the sending device 106A, a token administration system 100 associated with transfer of the pre-funded token 11, a third party administrator 101 associated with the token (e.g, an administrator 101 associated with a funding account, rewards provider, or general ledger account), or a third party data security provider 102 can route to the recipient 105/106B of the pre-funded token pre-funded token transfer delivery notification data set comprising a personal identification number (PIN) or other transaction verification/authorization data set, to be used by the recipient 105 in confirming the user's authority to access the transferred pre-funded value amount for deposit in an account associated with the recipient 105/106B, to satisfy a proposed transaction with a merchant system 102, or otherwise authenticate the user 105. For example, any one or more of such systems 106A, 100, 101, etc., can route to the recipient 105, 106B an e-mail, social media message, text message, or transfer notification or delivery notification data set comprising an embedded hypertext link or other reference pointing to an instruction command associated with a virtual wallet or merchant app 300, 306 on the device 106B, or on a system 100, 101, 102, etc., the instruction being adapted to generate a user interface for display on a device 610 on the device 106B, comprising text notifying the user 105 of availability of the transferred token and inviting the user 105 to complete any desired or required verification processes, such as entry of a PIN, biometric index, or other identifier prior to allowing the recipient device 106B to pull or otherwise receive the transferred token data set 11 into secure memory 606, 616 controlled by or otherwise associated with the device 105B.

Figure 6A:
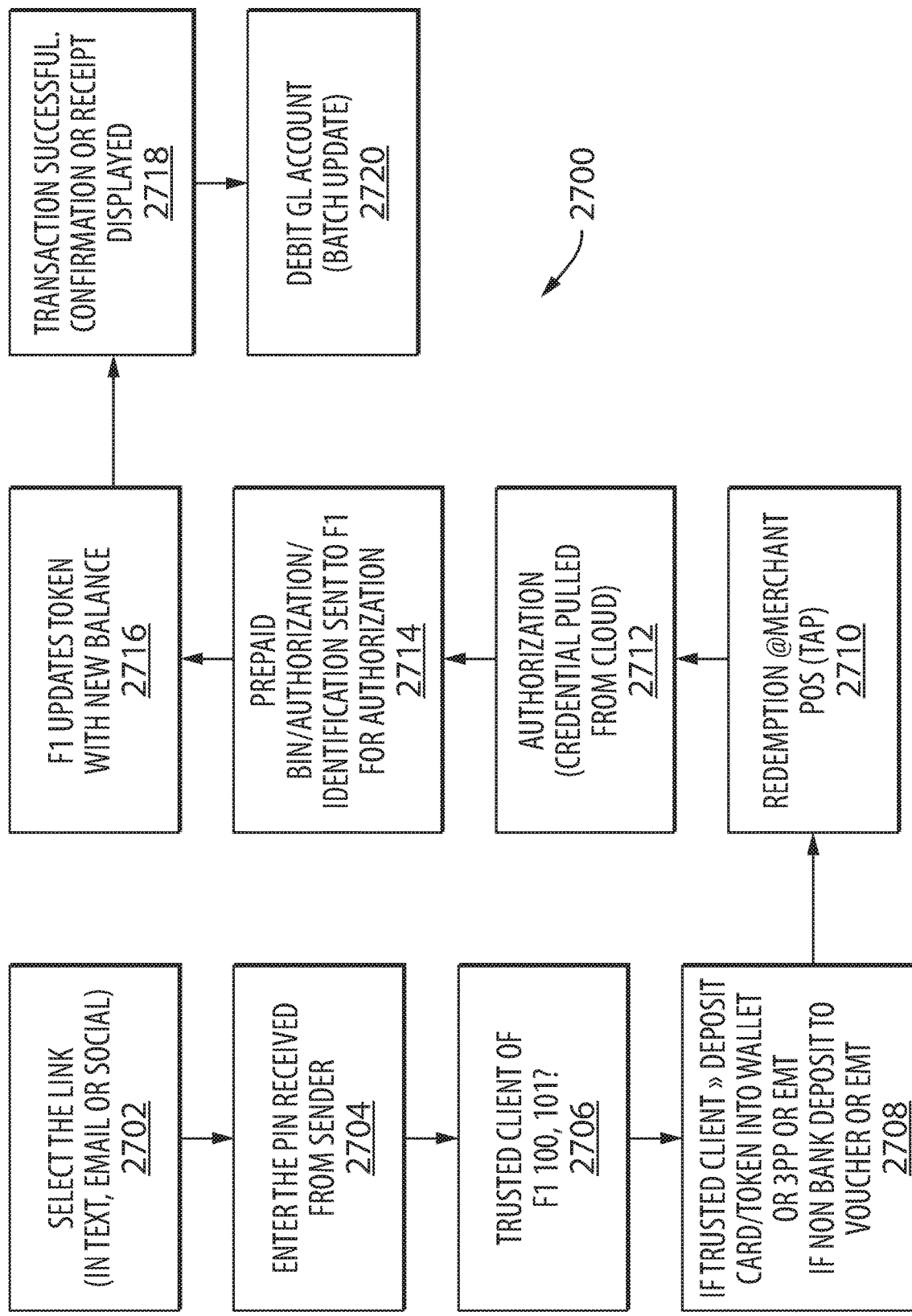
FIG. 6A is schematic diagrams illustrating an embodiment of a process flow useful in generating pre-funded token data sets and effecting pre-funded payment transactions in accordance with the disclosure.

FIGS. 6A and 6B illustrate an example process 2700 for receipt, redemption (expenditure) and other processing of a transferred pre-funded token data set 11 received by a second user 105 on her/his device 106B from a first user 104 of a device 106A. In the embodiment shown in FIG. 6A, a (sub)process of using or otherwise accessing generating the token can begin at 2702 with invocation by the second user 105 of a command to display or otherwise access data representing a pre-funded token notification data set as described above. As shown in FIG. 5B, for example, a recipient 105 can receive and be presented by a touchscreen and/or other device 610 of the user's device 106B with an interface display representing a message 4402, via e-mail, text, or other application (including any type of social media notification), using either push or pull technology, indicating that a prefunded gift token data set 11 has been generated for her/him. For example, a hypertext link or other interactive item 4404 can be embedded in a text message 4402 displayed on a text or social media display screen 4400. The recipient (second user) 105 can touch or otherwise activate the link 4404.

If the pre-funded token has not yet been delivered to the recipient's phone, selection of item 4404 can cause the pre-paid token data set to be transferred to the user's device 106B from any or all of the generator's device 106A, or any responsible system 100, 108, 102 (e.g., where the token has been stored in the cloud).

Alternatively, selection of the item 4404 can allow the recipient 105 to access the token data set while the pre-funded token remains securely stored in memory outside the recipient's device 106B controlled an administrator or other system 100, 102, 108 (e.g., the token can remain stored in the cloud). As previously explained, in some such embodiments authorization data comprised by or otherwise associated with the token data set can be updated or otherwise modified to indicate that authorization(s) for use of the token in a transaction have been modified.

In either case, selection at 2702 of the interactive item 4404 can cause generation and display on the recipient's device 106B of a notification interface 4500 such as that shown in FIG. 6B. In the embodiment shown in FIG. 6B, notification interface 4500 enables the recipient 105 to select from a plurality of options 4502, 4504, 4506, etc., including options 4502 for storing the pre-funded token in local or remote secure memory associated with a virtual wallet application 306 associated with the administrator or FI that authorized generation of the token; 4504 for storing the token in local or remote secure memory associated with a virtual wallet application 306 associated with the recipient's own bank or other FI, or associated with a merchant/consumer application 300; or 4506 for to download the token to the recipient's device for local storage in memory of the user's own device 106B, to generate a voucher reflecting deposit of a value associated with the token into an account owned by or otherwise accessible to the user 105, or to satisfy a transaction with a merchant system 102, etc. In the latter case, all or any selected amount of funds associated with the pre-funded token 11 can be routed directly to an administrator system 100, 101 for deposit into an account owned by or otherwise accessible by the user 105.

As previously mentioned, a significant advantage offered by the invention is the ability to format, store, and otherwise process the pre-funded token data set according to any desired payment or value-transfer protocol.

Optionally, prior to execution of any processes designated by selection of any of the options 4502, 4504, 4506 by a recipient 105 can be conditioned upon verification of the user 105's identity and/or authorization to access and control funds associated with the transferred token 11. For example, selection of any of the items 4502, 4504, 4506 can cause generation and display on an input/output device 610 of the user's device 106B, at 2704, of a user interface 4550 comprising a prompt for a password or other authentication code or verification information which, as described above, may have been routed to the recipient 105 by separate means, such as an e-mail, text, physical letter, or other device. Alternatively, the recipient may be invited to present another credential, such as a fingerprint, retina scan, or other biometric identifier.

Thus, for example, the sending user 104's data communication device 106A can generate a pre-funded token transfer data set comprising data configured to cause a device 1066 associated with the network address associated with the at least one pre-funded token transfer recipient 105 to initiate a recipient verification process.

Subject to entry of such data or satisfaction of such criteria, at 2708, the pre-paid token data set can be processed (e.g., stored) in accordance with an authenticated recipient's selection at 2706, as described above.

As shown at 2706-2708, the selection by a user 105's device 106B of options 4502, 4504, 4506 for presentation as part of an interface 4500 can be conditioned upon the existence, non-existence, or nature of any relationship(s) between the recipient 105 and one or more administration systems 100, 101, as indicated for example by authorization data comprised by or otherwise associated with the token data set 11, which relationships may be independent of any relationships between the generating user 104 and such systems 100, 101. For example, if processing by a virtual wallet application 306, 306A and/or any of systems 100, 101 determines that a system 100, 101 is in a trusted relationship with the wallet application 306, 306A, device 1066, and/or user 105, then direct deposit of the token data set 11 and/or funds associated therewith into a secure memory 618 and or account administered by a system 100, 101 can be enabled by presentation of either or both of action icons 4502, 4506.

Trusted relationships suitable for use in implementing such aspects of the invention include those in which request or data communications device 106 such as a purchaser's or other user's mobile or desktop computer, and/or one or more applications installed thereon, including for example one or more virtual wallet and/or merchant applications, are registered with or otherwise certified by a trusted authentication platform, or 'trusted platform,' such as a server operated by or on behalf of a central registration or certification authority. Upon completion of such registration or certification, or at any time(s) thereafter, such device(s) and/or application(s) may be provided with one or more secure electronic tokens or identifiers useable by the trusted platform and other devices, such as payment account administration servers, to verify or otherwise identify a trusted relationship with the requesting communication device 106. As described herein, such tokens or identifiers may be the included with, or distinct from, secure pre-funded tokens 11 that can be provisioned to such request communication devices for use in the processing and completion of mobile payments, as described herein In embodiments of the invention in which a pre-funded token is reusable, for example where a token data set 11 may be used in a transaction valued at less than a pre-funded negotiable amount associated with the token data set 11 and remaining amounts may be used for further payment transactions, deposits, etc., PINs and/or other verification data used at 2704 can be reusable, so that further notifications or messages are not required as a condition of use of the negotiable pre-funded token data set 11.

In many embodiments of such aspects of the system, storage of a transferred pre-funded token data set 11, or secure reference thereto, in accordance with any of the foregoing can cause data representing or otherwise associated with the transferred token data set 11 to be deleted from the sending user 104's device 106A, or can otherwise cause any access to or use of such a pre-funded token data set by the first user to be prevented or otherwise restricted. In such a case, for example, any or all of systems 1066, 100, 101 can route to the sending device 106A and/or any of systems 100. 101 an instruction to delete the token data set 11, or to modify authorization/verification code(s) or other data associated therewith to prevent such access or use. In other words, for example, the sending user 104's device, or any of systems 100, 101 can cause negate negotiability of a pre-funded token data set 11 associated with a pre-funded amount corresponding to that of the at least one negotiable pre-funded token transfer amount.

At 2710, 214 a recipient 105 of a pre-funded token data set 11 can initiate a process of redeeming the pre-funded token by, for example, using a merchant internet website shopping application 300, or attending at a merchant premises 102 and using any of a wide variety of POS or POT transaction processing techniques, including NFC, RFID, tap, and other processes, and initiating suitable 'checkout' procedures. When a suitable transaction has been negotiated between the user device 106B and the merchant system 102, at 2711 (FIG. 5B) a payment token, record, or authorization can be transferred to the merchant system 102. The user can use an authorization token transferred in such a transaction as negotiable currency or value, as in any virtual cash transaction.

As previously mentioned, the transaction protocol to be applied in a merchant transaction at 2710 can be selected or otherwise determined by the user 105, the merchant system 102, or any of the FIs 10, 101, or by the sender 104.

When a transaction initiated at 2710 is completed, vis-à-vis the user 105 and merchant system 102, pre-funded negotiable amounts associated with pre-funded token data set(s) 11 used in the transaction can be updated (e.g, debited) to reflect transfer of corresponding funds. If for example the transaction has exhausted funds associated with the token 11, then the amount may be set to zero and optionally the pre-funded token data set may be deleted from the user's device 106B, or access to it otherwise negated. If the transaction resulted in payment of a transaction amount less than the full authorized amount, then the amount of the payment may be debited (subtracted) from the amount, and the pre-funded negotiable amount associated with the token 11 may be updated accordingly.

In embodiments where a pre-funded token data set 11 is not fully negotiable, or is otherwise subject to approval by a token administration system 100, or where for example a pre-funded token comprises a reference to such a token that is stored remotely at a system 100, 101, at 2712-2714, based on the authentication at 2704 (and/or a separate authentication) a transaction authorization update or request data set can be routed by the user 105's device 106B to an adjudicating system 100, 101.

Where for example closing of a transaction initiated at 2708 is subject to approval by an administration system 100, 101, at 2714 a transaction authorization request data set can be routed to the adjudicating FI 100, 101 and the amount of the proposed transaction exceeds the pre-funded negotiable amount(s) associated with the token 11, the system 100, 101 can decline the transaction and optionally send suitably-configured notifications to any or all of systems 106, 102, 100, 101.

Where closing of a transaction initiated at 2710 results in payment of an amount less than the pre-funded negotiable amount(s) associated with the token 11, at 2712 a negotiable amount associated with the pre-funded token can be updated. Where the token 11 is a negotiable pre-funded token, then the among can in effect be debited by deleting or otherwise negating access to the pre-funded token 11 used to satisfy the transaction and creation of a new, negotiable pre-funded token 11 for the remaining amount. This can be accomplished, for example, by opening a new unique GL account as described above, and provisioning to the user 105's device 106B a new negotiable, pre-funded token data set 11 corresponding to the updated amount.

All of the above processes can be applied to negotiable pre-funded token data sets 11, regardless of whether the tokens 11 correspond to demand (debit), credit (including line of credit), loyalty, or other types of payment accounts.

Thus data representing the results of a transaction conducted at 2710 can can be sent to an account administrator 100 controlling accounting for or access to the funds with which the token 11 was authorized (e.g., an authorizing or adjudicating FI 100, 101) by the recipient's device 106B; and at 2716 the controlling administrator 100, 101 can update the value associated with the pre-funded token data set 11 by, for example, decrementing the value of the token in the amount of the requested transaction, either by re-writing the pre-funded token data set stored in a cloud location and/or by returning to the device 1066 instructions for decrementing a locally-stored token data set.

For transactions 2710 involving a return of a product to, and/or refund to the user 105 by the merchant system 102, updating of accounts and token data sets at 2716 can include incrementing or otherwise updating the negotiable pre-funded amount to reflect the refund or return.

At 2718, the token account administrator 100, the merchant 102, and/or the recipient's device 106B can complete processing of the transaction 2710 and confirmation of the transaction, including for example generation and issuance of any required or desired transaction receipt or notification data sets, which can be forwarded by text, e-mail, or communications specific to transaction applications 300, 306, etc.

At 2720, the account administration system 100 responsible for payment or other administration of the token, which may or may not be the same system 100, 101 which administers account(s) used to fund the token, can debit, credit, or otherwise update a GL account balance in the amount of the executed transaction value associated with the transaction 2710, so that the now tenderable funds represented by the token may be properly accounted for.

Thus, among other advantages the invention provides devices 106, pre-funded tokens 11, and methods and instruction sets for using them, that enable the devices to, in accordance with signals generated by at least one user input device 610 of a device 106, route to a merchant transaction system 102 a pre-funded transaction payment data set, the pre-funded transaction payment data set comprising data representing at least a pre-funded transaction payment amount and the negotiable pre-funded payment authorization.

Where pre-funded tokens 11 can be reused, e.g., where authorization codes provided with the tokens are provided for multiple transaction, the invention enables such devices, methods, and instructions, such that the devices 106 are enabled to in accordance with signals generated by the at least one user input device 106, route to one or more merchant transaction systems 102 a plurality of pre-funded transaction payment data sets 11, each pre-funded transaction payment data set comprising data representing at least a pre-funded transaction payment amount and the negotiable pre-funded payment authorization, wherein a sum of the plurality of pre-funded transaction payment amounts is less than or equal to the pre-funded negotiable amount.

Another advantage enabled by the invention is the splitting of negotiable, pre-authorized tokens 11 into multiples, each of which may be individually shared or otherwise transferred to recipients 105, 1066. For example, a pre-authorized token associated with pre-authorized negotiable value of $100 can be split into two tokens, each valued at $50, one token valued at $50 and five valued at $10, etc. This can, for example, be accomplished, by a user 104, 105 using one or more input-output devices 610 of his/her device 106 to cause the device to generate a plurality of secure negotiable pre-funded token transfer data sets 11, each secure negotiable pre-funded token transfer data set 11 comprising data identifying at least one network address associated with a pre-funded token transfer recipient and data representing the negotiable pre-funded payment authorization and at least one negotiable pre-funded token transfer amount, a sum of the plurality of negotiable pre-funded token transfer amounts being less than or equal to the pre-funded negotiable amount. The user can further cause the device to route at least one of the plurality of secure negotiable pre-funded token transfer data sets to each corresponding network address. As will be readily understood by those skilled in the relevant arts, routing of multiple token data sets 11 can include routing multiple token data sets to a single recipient 105, and/or single tokens to multiple recipients 105.

As noted above, at 2604 in FIG. 5A a token-requesting or generating user 104 can elect to browse a virtual catalog of goods and services and generate a pre-funded token 11 representing payment for one or more particular items and/or services; the resulting pre-funded token data set to be sent to a recipient 105 as, for example, a gift. For example, by selecting a command icon 4004, such a user 104 can cause generation and display of a user interface 6010, as shown in FIG. 6A. In the embodiment shown in FIG. 6A, a user is presented with a list, table, or other set of items 6012 from which to choose. In the example shown, a pictorial list or table 6012 of consumer electronics items is shown, each of the items representing a selectable command icon configured to retrieve further data related to a corresponding product, service, etc., in order to allow the purchasing user 104 to review of advantages of the products, etc. As those skilled in the relevant arts will appreciate, any types of goods or services, including real estate or anything else that can be bought, sold, or traded, can be displayed for use as the subject of a payment or other transaction.

Selection of a command item or icon 6014 from display 6010 by a generating user 104 can result in the generation of a display 615 showing details of a product, service, etc., depicted in the icon 6014. In addition, the user 105 can be provided with an icon 6016 to be selected if the user 104 elects to purchase the item as a gift for a recipient 105, and a return item 6017 to return the user 105 to the list 6012 for further review.

In the event that the user 104 elects to purchase the item 6014 and transfer a corresponding pre-funded token data set 11 to a second user 105, selection of the command item 6016 can cause generation and display of further options 6018 for shipping a physical item to the recipient 105, or 6020 for generating a corresponding pre-funded token transfer data set for routing to the user 105. Selection of item 6020 can result in display of further screens 6031-6035, and 4048 to complete designation of recipient, token value, and other data items for generation and confirmation of the pre-funded token transfer data set.

Figure 7A:
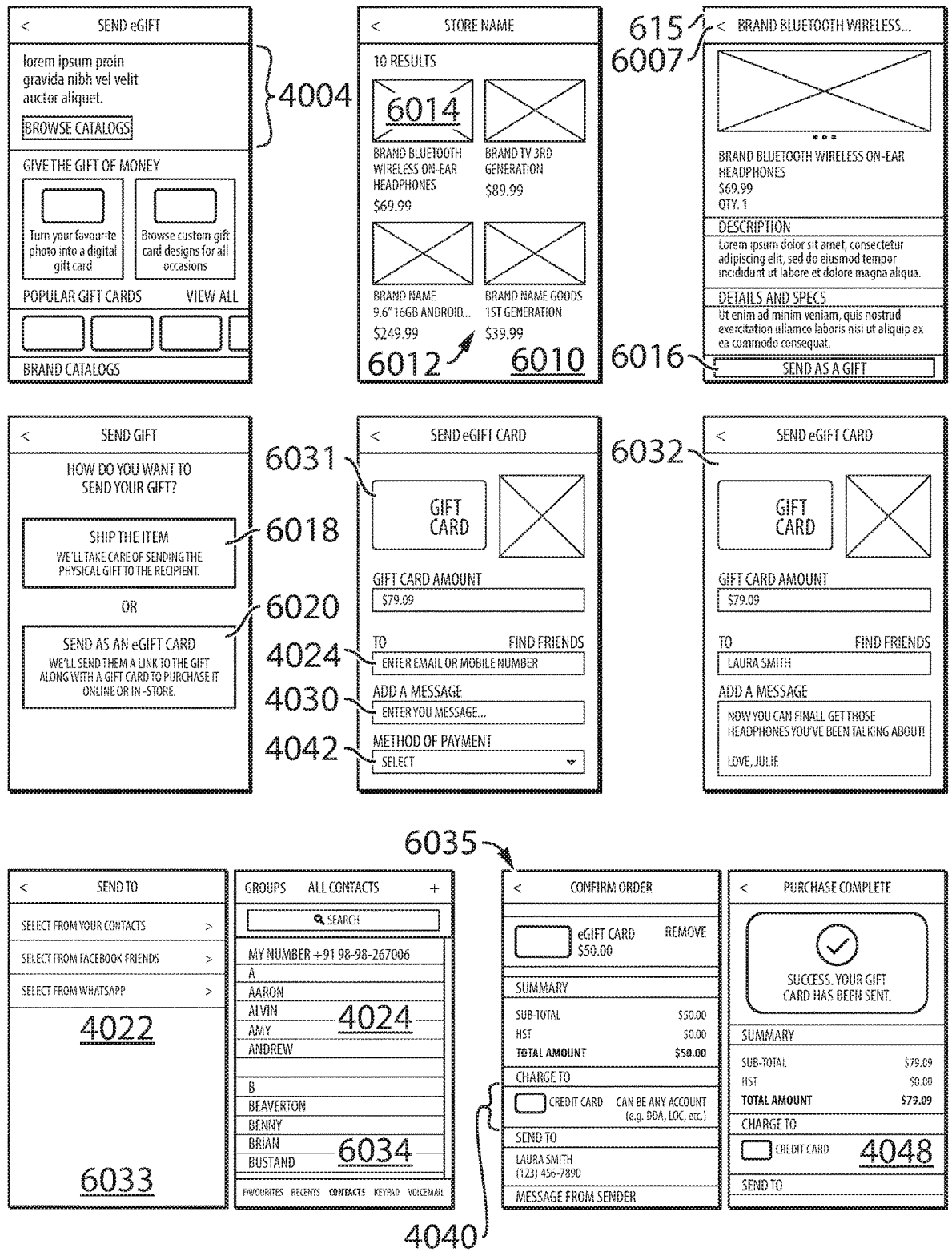
Figure 7B:
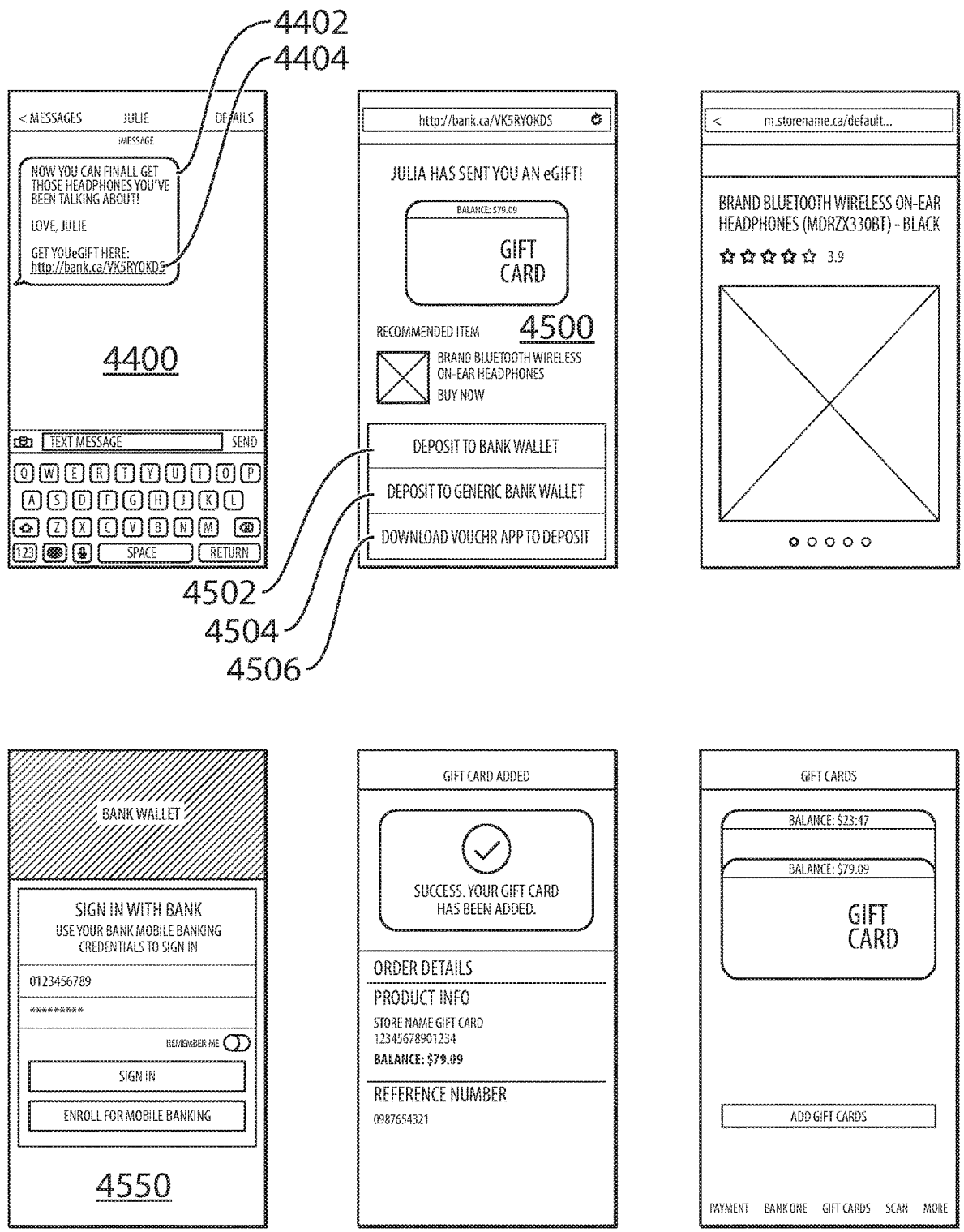

FIG. 7B illustrates display screens generated by a recipient device 106B for a recipient 105 to whom a pre-funded token data set has been transferred by a user 104, as for example described above. The process and display screens are generally similar to those described for a user 105 in connection with a purchase transaction as shown in FIG. 6A, with the pre-funded token 11 being associated with a specific item 6014, as designated by a first user 104. In such a case, a pre-funded token data set can comprise the following types of data records:

<security key><type code><currency><negotiable pre-funded transfer amount>

<issuing token administrator/payment authorization code><pre-funded authorization key><transferability indicator><protocol identifier><authorized recipient information>

<funding source identifier(s)><personalized information>

<personalized (photo and/or greeting) content>

<time/date stamp><expiration date/time><product identifiers(s)>

For example, either a "web code 10368836" or "model number MDRZX33OBT", or any other suitable representative value, may be used as a product identifier.

Figure 8:
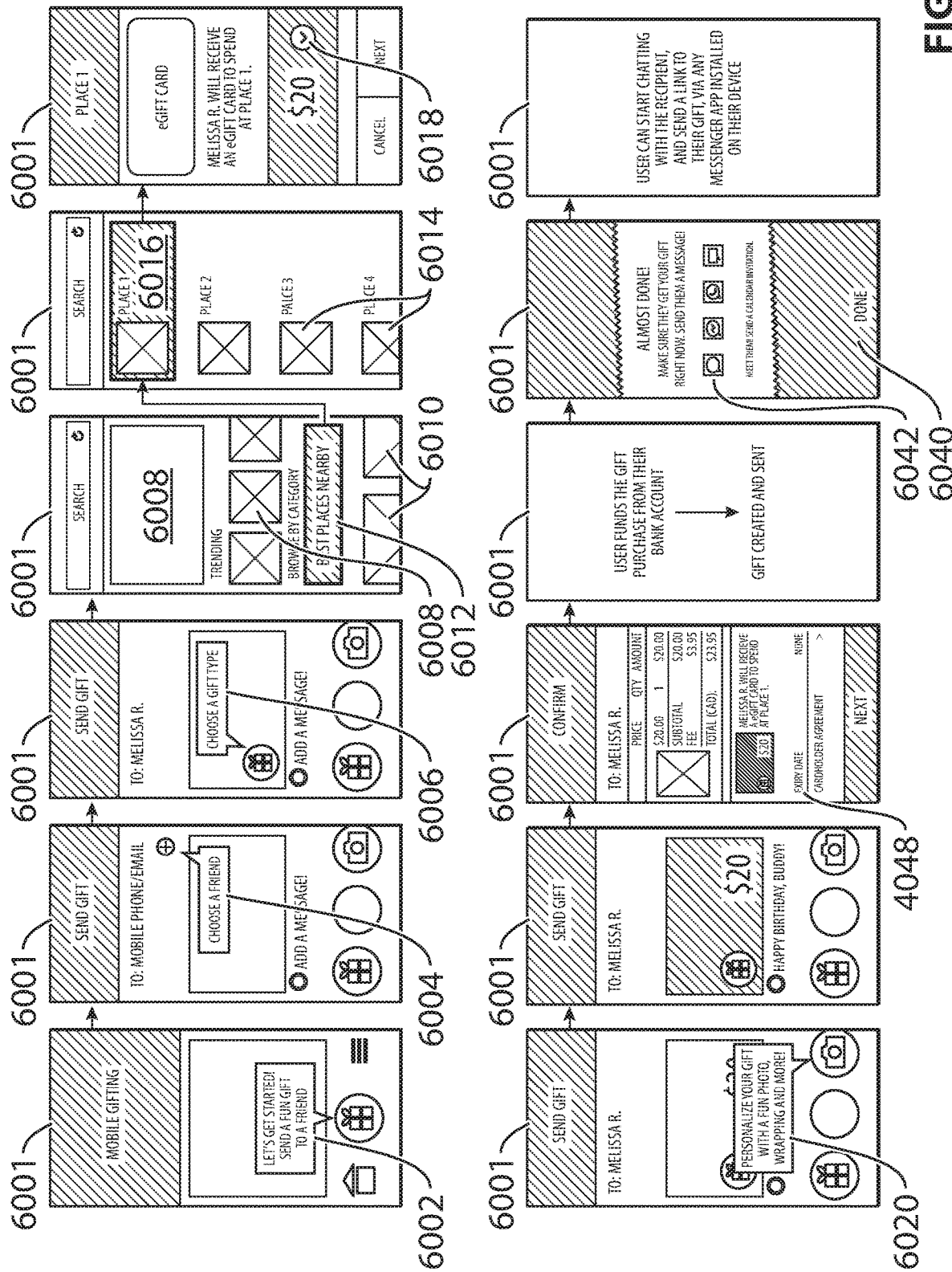

FIG. 8 shows further embodiments of interative user displays 6001 suitable for use by a user device 106A in generating pre-funded tokens and token request data sets in accordance with the invention. Using processes similar to those described above, a user 104 can use item 6002 to invoke a pre-funded token generation application, and thereby initiate a token-generation process as described above. The user can select an item 6004 to access a list or other set of contacts, etc., in order to designate a recipient 105 for the pre-funded token; and at 6006 can access a list or other set of types of tokens to be generated, for example item 6008 to generate a credit (cash equivalent) token, and at 6010 a list of categories for gift or other pre-funded transactions, such as food, entertainment, consumer articles, etc.

Selection of an item 6012 "Best Places Nearby," for example, can cause the device 106B, using GPS or other navigational subsystems, map functions, etc., to generate a list of popular restaurants, stores, etc., near the user 104's current location, another preferred location, etc., and display the list at 6014. Selection of an interactive command icon 6016 "The Harboard Room" can cause generation and display of a screen including one or more items 6018 such as a drop-down menu or input field to enable the user 104 to designate a pre-funded transaction value to be associated with a pre-funded token request data set for routing to an issuing FI 100. At 6020, the user 104 can be provided with input options for personalizing a pre-funded token notification data set to include messages such as "happy birthday," "congratulations," etc., and to attach photographs, sound bites, and other media files or references.

At 6040, a user 104 who has completed a pre-funded token request data set can be provided with one or more options 6042 for initiating instant ('real-time') communications with the intended recipient 105, via any desired means, including a variety of social media.

FIGS. 9-13 provide further examples of processes enabled by systems 10, devices 106, and pre-funded token data sets 11 in accordance with the invention.

Figure 9:
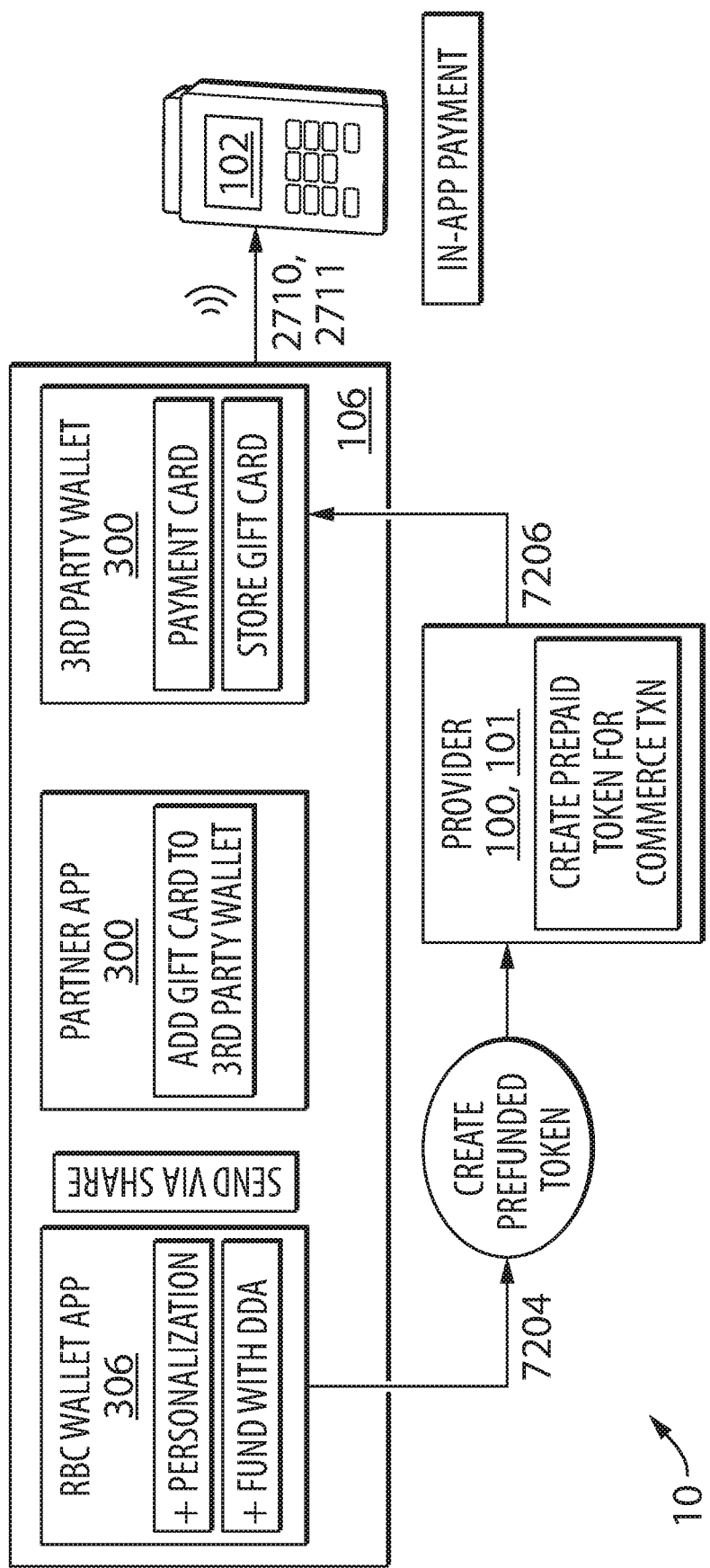
FIGS. 9-13B are schematic diagrams illustrating embodiments of process flows useful in generating pre-funded token data sets and effecting pre-funded payment transactions in accordance with the disclosure.

In the embodiment shown in FIG. 9, a user 104, 105 applies a negotiable pre-funded token data set 11 to satisfy a transaction. An example of a process flow associated with the transaction is shown in FIG. 5B. At 2618, 207 in FIG. 5B, as described above, a user 105's device 106B can receive a negotiable pre-funded token transfer data set from a user 104's device 106A. If the user 105 wishes to use the negotiable token data set 11 in a transaction with a merchant system 102 that requires a particular payment protocol, e.g., a particular debit or rewards payment protocol, then at 7202 the user 105 can use his/her device 106B to generate a corresponding negotiable pre-funded merchant card token request data set, comprising data representing any or all of the data received with the pre-funded token transfer data set at 2618, 207, including for example a suitable pre-funded token authorization code provided by the token administration system 100 that generated the token 11, and route it to his own bank 100, 101 or another appropriate FI or administration system 100, 101.

The bank 100, 101 can review the merchant card token request data set and adjudicate the request. If desired or required criteria are met, including for example verification of the user 105's identity and the pre-funded token authorization code, as for example explained above, then at 7206 the token administration system or FI 100, 101 can generate a negotiable pre-funded merchant card token data set in accordance with the request, and subject to any suitable or desired restrictions, and route the pre-funded merchant card token data set to the requesting user 105/device 106B. At 7208, the recipient 105 can store the received negotiable pre-funded merchant card token data set to secure memory controlled by a desired virtual wallet application 306, 306A, and at 2710-2711 the user 105 can apply the negotiable pre-funded merchant card token data set in full or partial satisfaction of a purchase or other transaction at merchant POS system 102. Because the pre-funded token data set 11 comprises an authorization code indicating that the pre-funded token is negotiable, neither the merchant system 102 nor the user device 106 need seek any approval or other processing prior to closing the transaction.

Figure 10A:
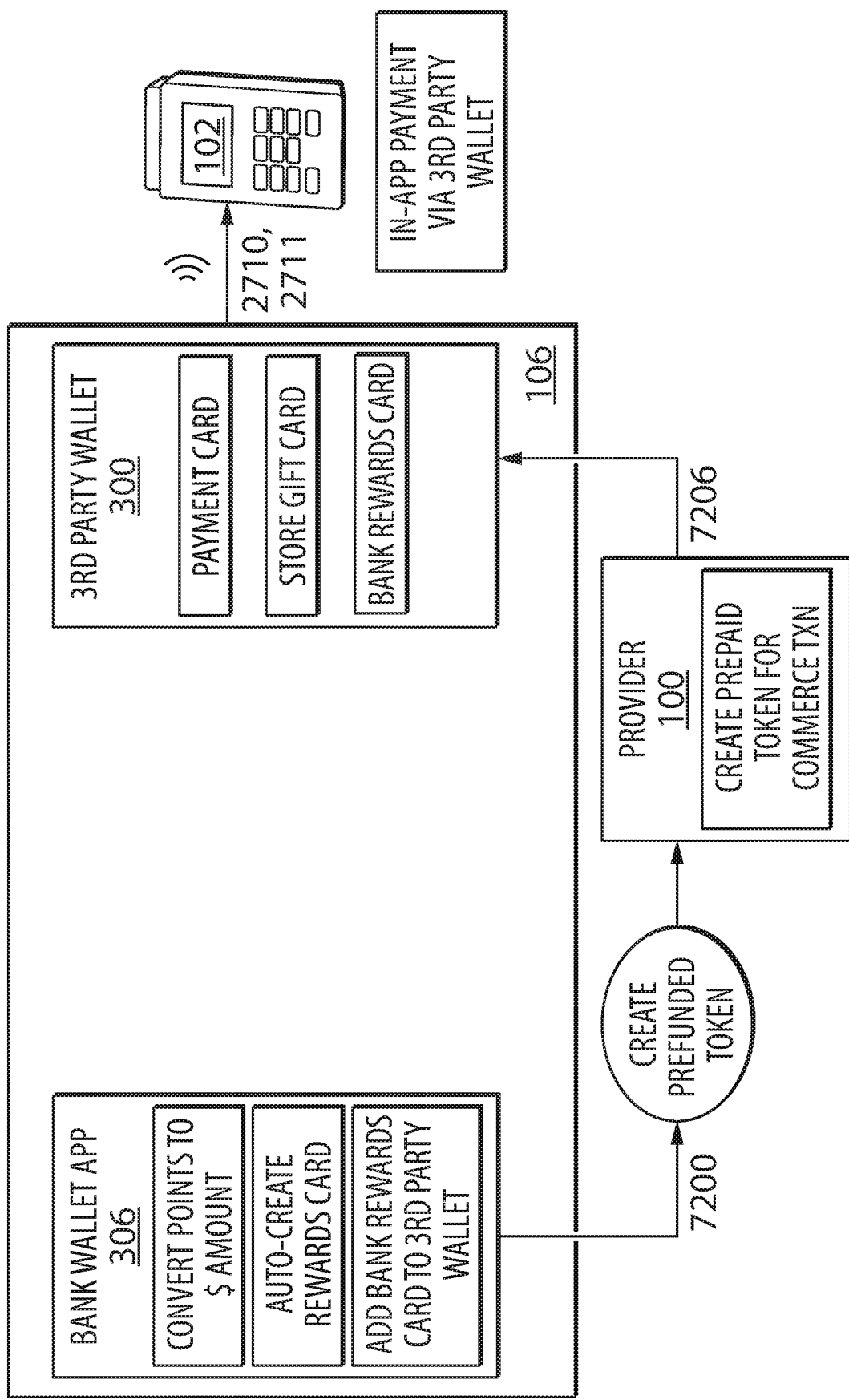
Figure 10B:
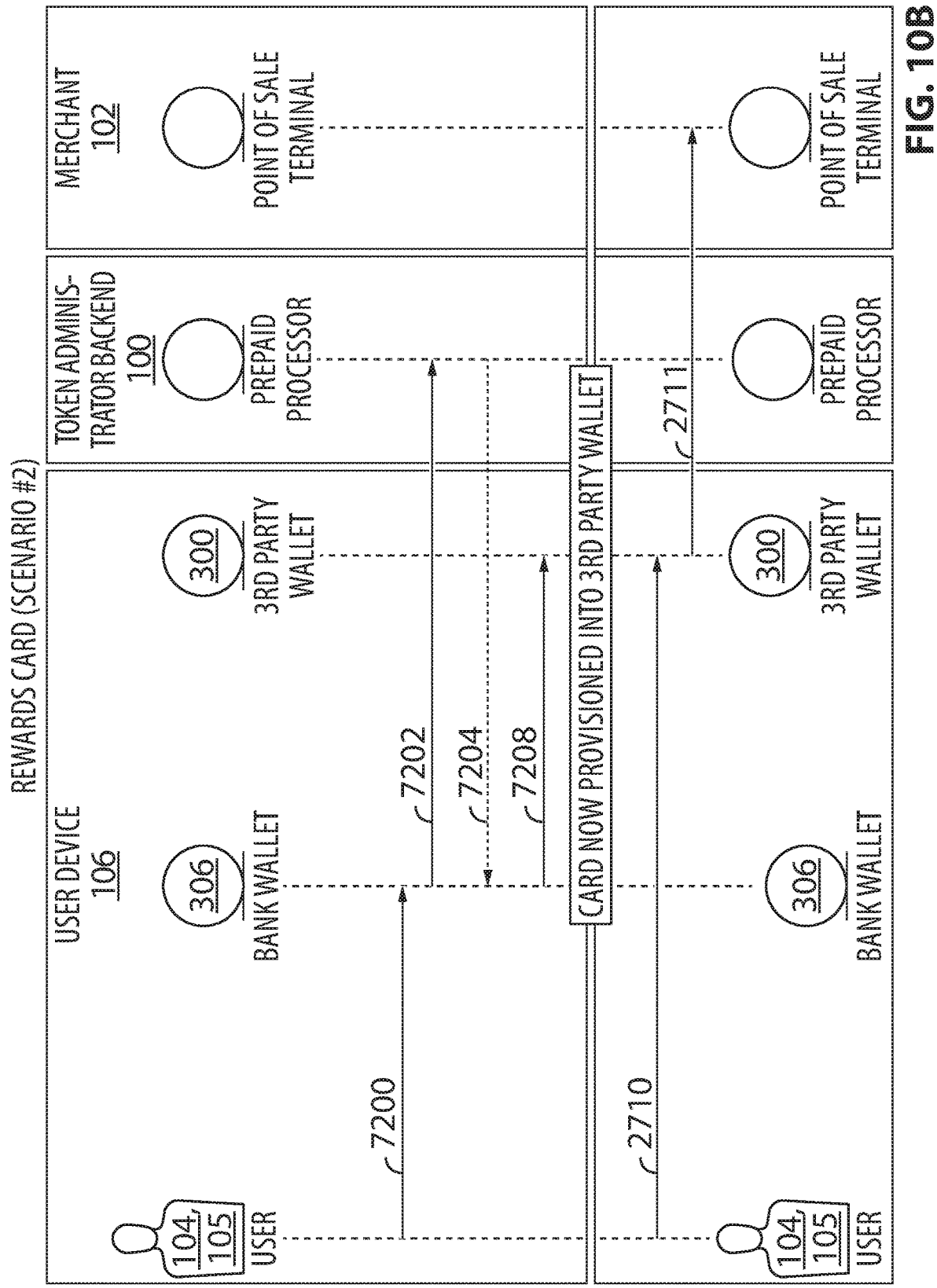

In the embodiment shown in FIGS. 10A and 10B, a user 104 acquires a negotiable pre-funded token request data set and applies it toward a purchase at a merchant POS system 102. In the specific example shown, the user 104 purchases a first type of reward or loyalty points, associated with a merchant system 102, using a demand deposit, credit, or other rewards points account administered by his FI 100, and uses the purchased points in full or partial satisfaction of a transaction at a merchant POS 102. It is to be understood that any form or source of funds or other real or virtual value may be used; all suitable currency/points exchanges and protocol formatting can be handled by the token administration system 100.

At 7200, the user 104 uses one or more input/output devices 610 of a device 106 to access a virtual wallet application 306 associated with his/her bank or other FI 100 and generate a negotiable pre-funded token request data set, the request data set comprising data indicating that the token is to be funded using a first type or class of rewards points (e.g., rewards points associated with his bank 100), and to be negotiable in the form of a second type or class of rewards points (e.g., a rewards point scheme used by a desired merchant system 102.

At 7202, the user 104 causes the virtual wallet application 306 to route the token request data set to the FI 100 associated with the wallet 306. At 7204, the Fi/administration system 100 to which the token has been routed, having adjudicated and approved the request, debits the user 104's first rewards account and generates a pre-funded token data set 11 for a corresponding amount payable in the second, merchant rewards points; and routes the token set 11 to the device used or otherwise designated by the user 104.

At 7208, the user 104 uses the virtual wallet application 306 to store the pre-paid merchant points token data set 11 in memory associated with a merchant/consumer wallet application 300 associated with the desired merchant system 102.

With a pre-paid card, negotiable in the rewards or other value system desired by the merchant system 102 and/or user 104, stored in memory controllable through the merchant application 306, at 2710 the user 104 approaches a merchant POS 102, and, using the merchant wallet application 300 and for example an NFC data communication system 616 of his/her device 106, negotiates the purchase with the merchant POS 102, and at 2711 causes the merchant wallet application to route the pre-paid merchant points token data 11 set to the merchant POS system 102 in full or partial satisfaction of the transaction. Because the pre-funded token data set 11 comprises an authorization code indicating that the pre-funded token is negotiable, neither the merchant system 102 nor the user device 106 need seek any approval or other processing prior to closing the transaction.

Figure 11A:
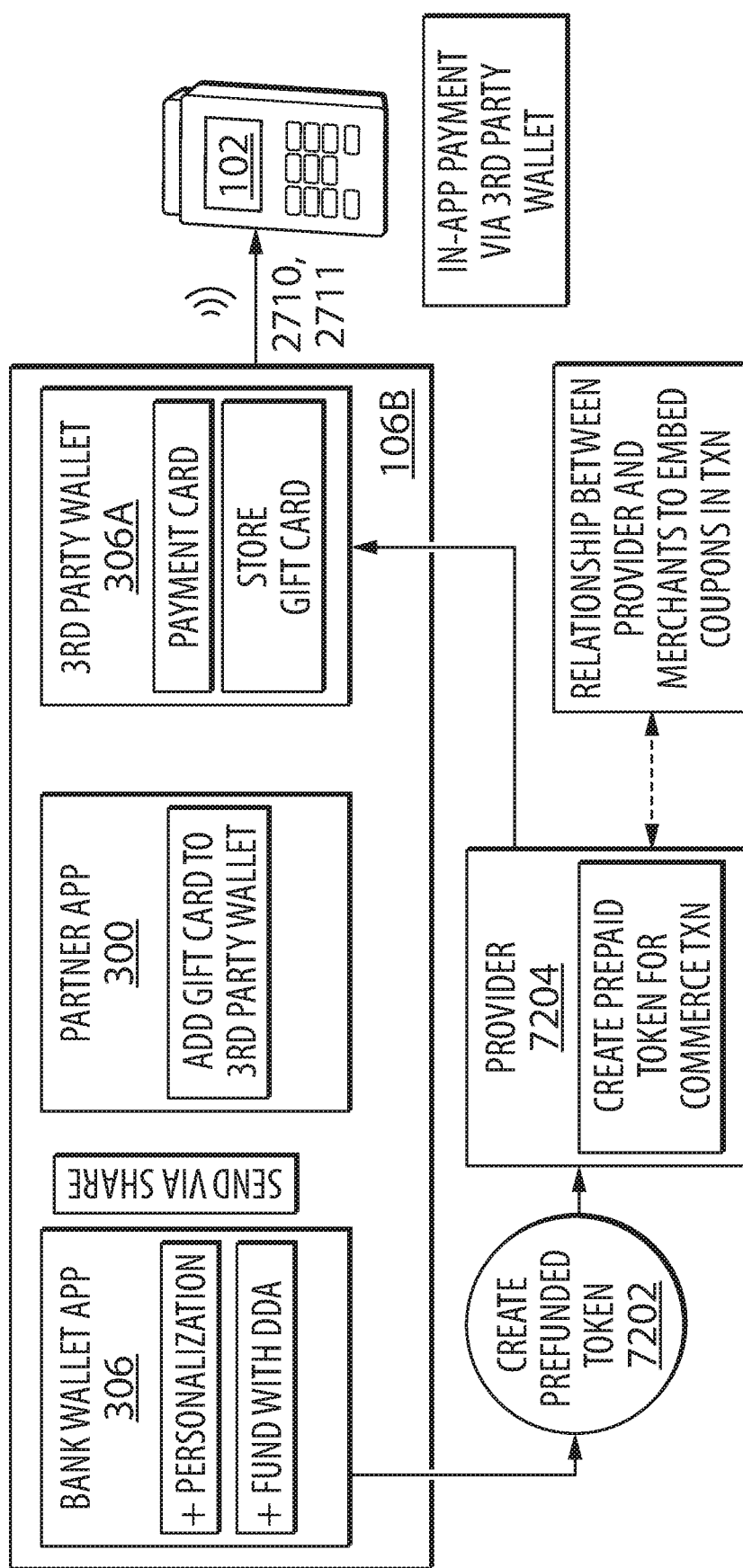
Figure 11B:
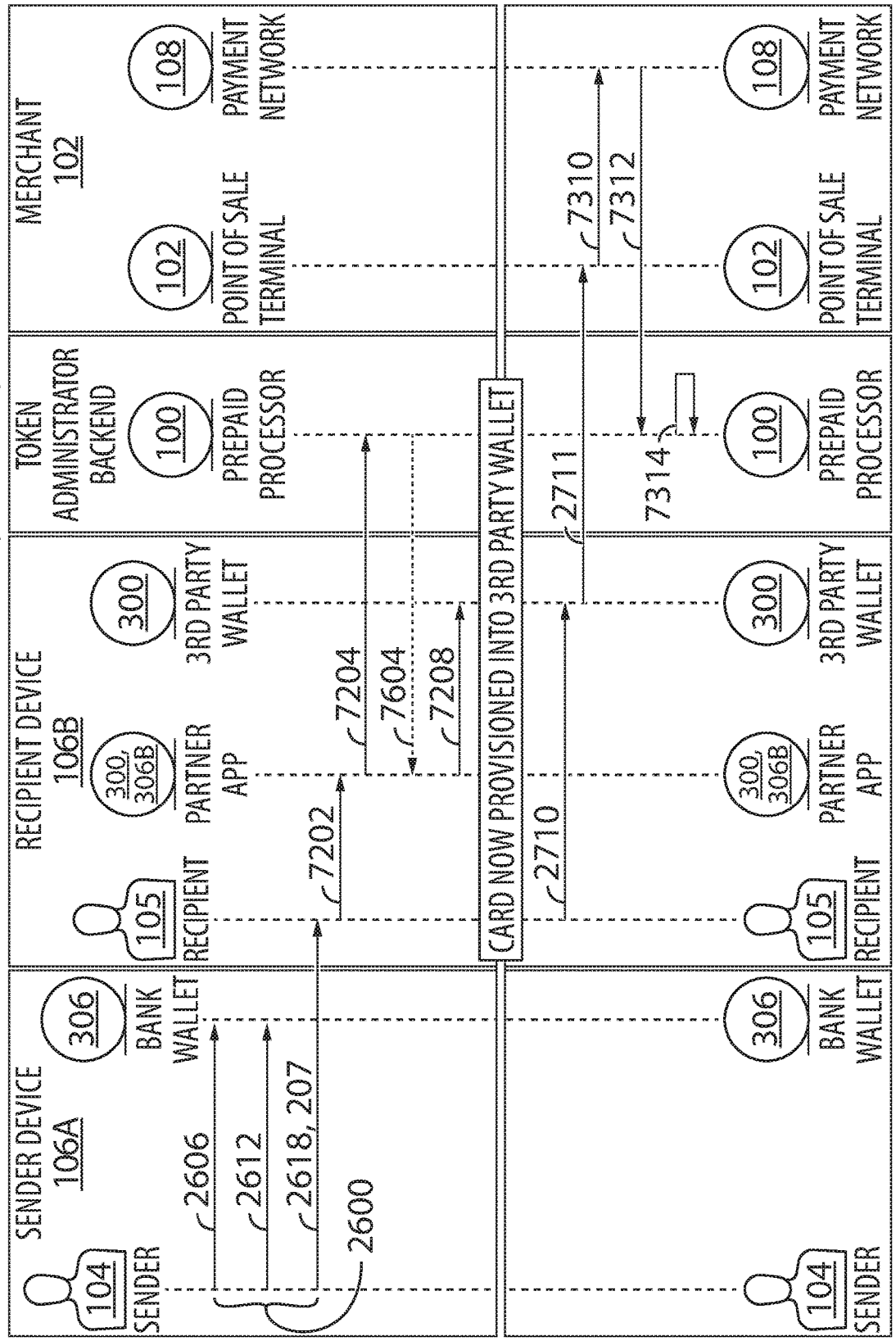

In the process shown in FIGS. 11A and 11B, a recipient 105 receives a virtual pre-paid gift card from a token acquirer 104, and then redeems the gift card, along with a virtual coupon (i.e. a conditional discount rule), at a merchant premises 102. The process shown in FIGS. 11A, 11B is adapted, for example, to encourage and enable cooperation between merchant systems 102 and token issuers 100 for their mutual benefit and the benefit of their mutual customers.

At 2600 in FIG. 11B, the user 104 uses one or more input/output devices 610 of his/her device 106A to access a virtual wallet application 306 associated with his/her bank or FI, which acts as a token administrator 100 to generate a corresponding pre-funded token.

As described in greater detail above, at 2606 the user 104 accesses a virtual wallet application 306 and uses it to generate a personalization data set for use in transferring a pre-funded token data 11 transfer set to the recipient 105; and at 2612 uses the app 300 to generate the pre-funded token data set 11, with full or partial funding for the token 11 being applied from the user 104's demand deposit account. At 2618, 207, the user 104 shares the pre-funded token data set 11 with a friend, colleague, or other recipient 105, who stores the token in secure memory on his device 106B. As discussed above, sharing of the token can be accomplished by using a pre-funded token transfer data set that includes some or all of the personalized content generated at 2606, or personalized content may be separately forwarded by means of a separate notification communication, such as an e-mail or social media message.

At 7202, the recipient 105 accesses a virtual wallet or merchant app 300, 306B provided by or otherwise associated with a partner such as a merchant system 102, a rewards program administrator 101, etc. Using the partner app 306B by means of one or more input/output devices 310 on the recipient 105's device 106B, the recipient causes the application 306B to initiate a process of preparing the token 311 for redemption through the partner app 306B. At 7204 the partner app 306B negotiates with the recipient 105's bank 100 to modify the token data set 11 by adding or otherwise associating with it data representing a virtual coupon, merchant reward points, or other added value to create a pre-funded merchant card token data set 11. At 7604, the bank/token administration system 100 returns the pre-funded merchant card token data set 11 comprising authorizations suitable for pre-authorizing the token for purchase(s) of value(s) equivalent to the token 11 transferred to the recipient at 2618, 207, plus the added value represented by the virtual coupon/rewards data set. At 7208, the partner app 306B causes the pre-funded merchant card token data set 11 to be stored in secure memory on the recipient 105's device.

At 2710-2711, the recipient 105 applies the pre-funded merchant card token data set 11 in full or partial satisfaction of a purchase or other transaction at merchant POS system 102. Thereafter, at 7310-7312 the merchant system 102, using a third-party payment network 108, and receives payment in full from the recipient's FI 100.

At 7314, the recipient's FI 100 applies virtual coupon or rewards value associated with the pre-funded merchant card token data set 11 and reconciles the transaction with the GL account associated with the token, as described above, updating the authorized pre-funded amount associated and/or creating a new GL account to replace the original token authorization, as appropriate.

Figure 12A:
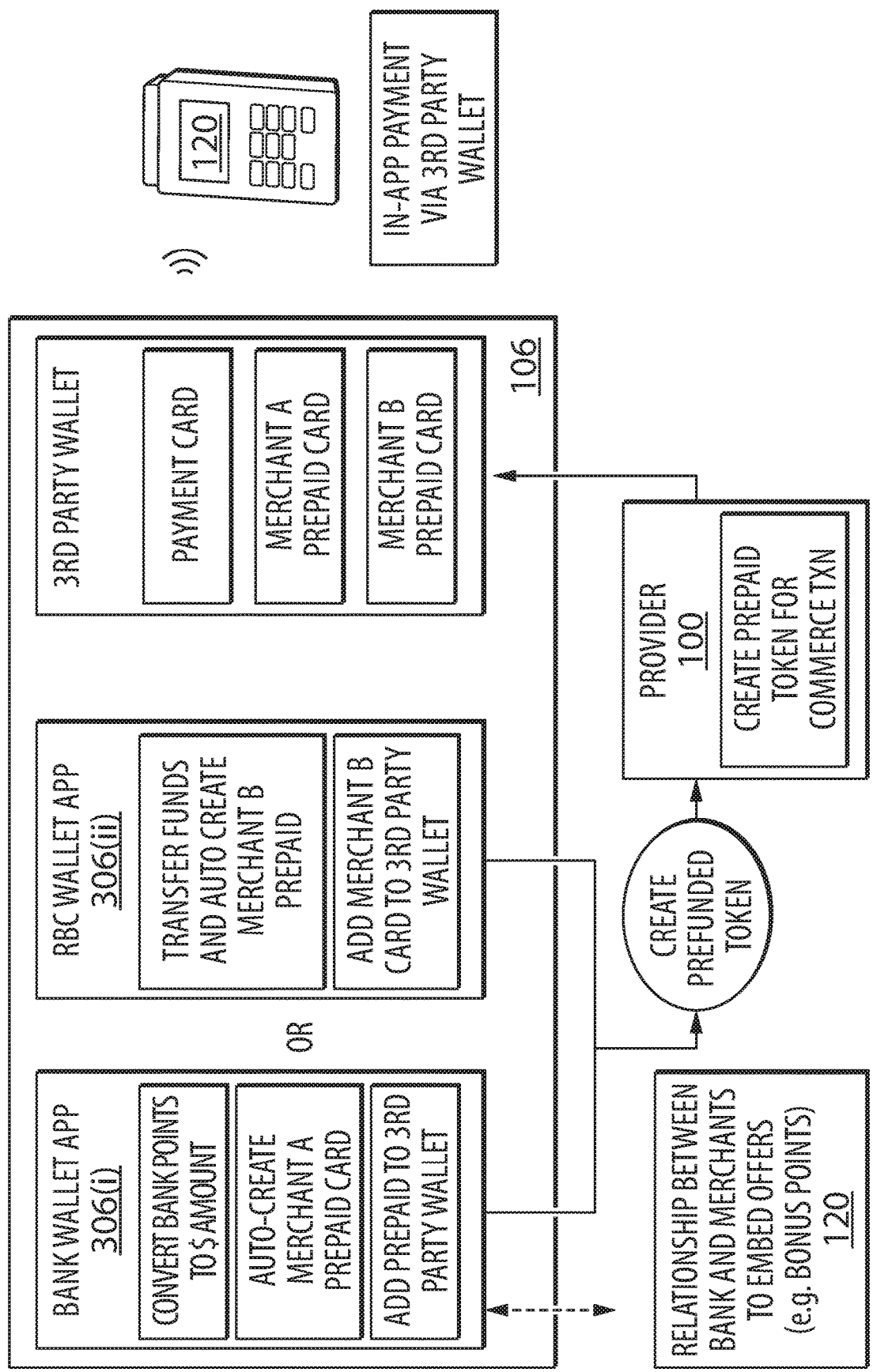

FIGS. 12A and 12B illustrate a process whereby a token administrator 100 can cooperate with one or more partners such as merchant system(s) 102, for their mutual benefit and the benefit of their mutual customers, through use of the administrator's own wallet application 306, rather than a merchant app 300 installed on a user 104's data communication device 106.

At 7200 in FIG. 12B, the user 104 uses one or more input/output devices 610 of his/her device 106A to access a virtual wallet application 306 associated with his/her bank or FI, which acts as a token administrator 100 to generate a corresponding pre-funded token. At 7202, the user causes the virtual wallet application 306 to generate a pre-funded token request data set and route it to the token administration system 100 associated with the wallet app 306.

On the basis of previously-established terms, the token administrator 100 generates a pre-funded token data set 11 comprising merchant and/or product restriction data comprising account numbers or other identifiers, or other data representing one or more specified merchant entities and one or more coupon values to be associated with the token 11 when used in a purchase or other transaction conducted in cooperation with the merchant's transaction system 120. A single identifier can, for example, be coded to identify both a coupon or award arrangement to be associated with a proposed purchase transaction, and one or more merchants by whom such arrangements will be honored; and included as a data item or field "<merchant or product restrictions>" in a pre-funded token data set, as explained above. Such pre-funded token data sets can, for example, be referred to as merchant-restricted prefunded token data sets.

At 7208, the user 104's virtual wallet app 306 causes the merchant-restricted pre-funded token data set 11 to be stored in secure memory on the recipient 104's device, optionally in secure memory associated with a merchant or consumer app 300.

At 2710, the user 104 uses his/her device 106 to navigate to a website 102 associated with a merchant identified by the restriction data, or approaches such a merchant's POS device 102, and uses the merchant app 300 to negotiate a purchase or other transaction to be fully or partly satisfied through use of the merchant-restricted pre-funded token data set 11. At 2711, the user causes the merchant app 300 to route the merchant-restricted pre-funded token data set 11 to the merchant website or POS 120 as full or partial payment.

At 7701-7702, the merchant system 102 routes a transaction authorization request data set to the user 104's FI and/or token administrator 100 via third-party transaction processor(s) 108, using a third-party payment network 108

At 7704, the user 104's FI and/or token administrator 100 adjudicates the merchant's transaction authorization request data set by, for example, verifying the authenticity of the merchant-restricted pre-funded token data set 11 and confirming compliance with all restrictions, such as the identity of the merchant system 120. If, for example, the transaction request data set is not generated or routed by an approved merchant system 120, the transaction request can be denied.

Conditioned on satisfaction of any restrictions checked at 7704, the FI and/or token administrator 100 can apply any virtual coupon (e.g., discount rule) and debit a GL account associated with the merchant-restricted pre-funded token data set 11, complete any further required payment processing to ensure payment in favor of the merchant 120, if applicable, and confirm completion of the transaction to either or both parties 104, 120.

Figure 13A:
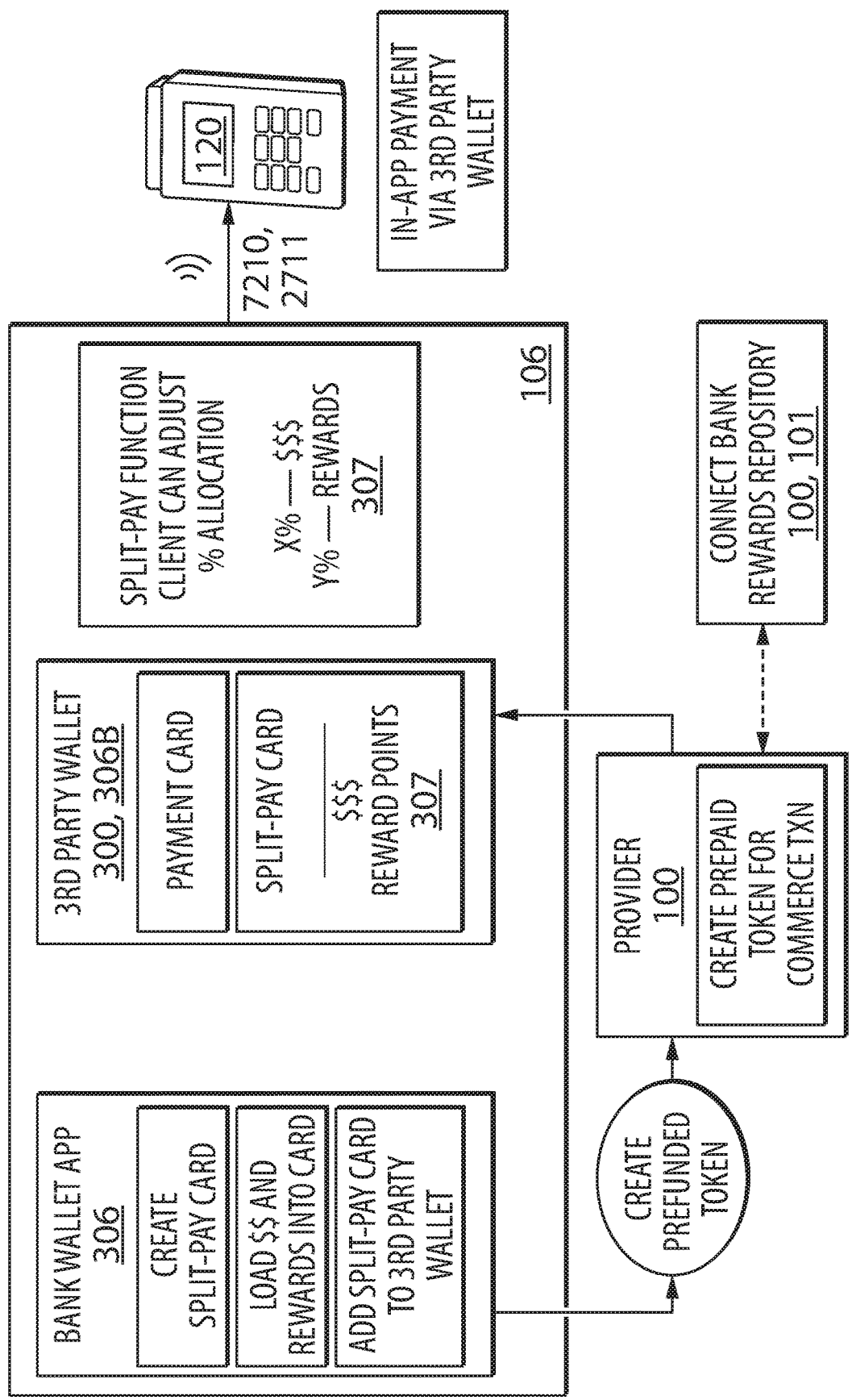

FIGS. 13A and 13B illustrate a process whereby a user 104, 105 of a device 106 can fund a token using multiple funding sources. In the example shown, a user 104 funds a pre-funded split-pay token data set 11 using both a demand deposit or credit account and rewards points associated with the user 104's FI and/or token administrator 100, and/or another financial institution 101 or merchant system 120.

At 7200 in FIG. 13B, the user 104 uses one or more input/output devices 610 of his/her device 106A to access a virtual wallet application 306 associated with his/her bank or FI, which acts as a token administrator 100 to generate a corresponding pre-funded token. At 7202, the user causes the virtual wallet application 306 to generate a pre-funded token request data set and route it to the token administration system 100 associated with the wallet app 306. In this case, the user requests that multiple funding sources, namely a direct deposit or other currency-based account and a rewards point account, be applied to fund the token. In embodiments of fully-negotiable pre-funded split-pay token data sets, each of the multiple funding sources can correspond to distinct GL accounts, as described above.

To designate the amounts, or relative amounts, of each of the multiple funding sources is to be applied to fund the token, the user 104 can access a split-pay funding feature 307 provided by the user's virtual wallet app 306, or another wallet or merchant app 300, 306B provided on or otherwise accessible from the user's device. Such split-pay funding features can comprise any of a wide variety of attributes and functionalities, including for example interactive 'sliders' and other GUIs, as described for example in applicant's co-owned, co-pending U.S. patent application Ser. No. 15/201,428, which has been published as US 2017-0017958 and incorporated by reference above.

When the user 104 has completed entry of all desired or required data, the user can cause the application 306 to generate a pre-funded split pay token request data set 11. Such a data set can, for example, comprise some or all of the following data items:

<security key><type code><currency><transferability indicator><protocol identifier><funding source identifier(s)><pre-funded source amount A><pre-funded source amount B><personalized information><time/date stamp>

<expiration date/time>

Where for example the various fields have meanings described above, except that:

<type code>=SP for "split pay" token request

<funding source identifier(s)>=accounts to be applied to fund the split pay request <pre-funded source amount(s) A, B>=amounts to be charged to fund the request from the respective funding sources Alternatively, for example, a combination of <type code> identifiers and <funding source identifiers> can be used to designate multiple funding sources and amounts or relative amounts to be applied from each fund, as described in more detail in the incorporated references. In such embodiments such fields, or for example a discretionary data field provided by a specific payment protocol can be used to indicate a split-pay payment information by populating a single data field with any code interpretable by a desired transaction processor 120, 160, 920, 1750, 2150, etc, as identifying a number of funding sources to be used to fund a transaction, identifying the funding sources to be used, and identifying the proportion of the value of the token to be funded from each of the funding sources. For example, a code suitable for insertion in such a field can comprise the following bits:

<SN/S1/P1/S2/P2/SX/PX>

Where:
SN=number of funding sources represented
S1=first fundingsource identifier
P1=percentage or amount of value to be funded by source 1
S2=second fundingsource identifier
P2=percentage or amount of value to be funded by source 2
SX=$X^{th}$ fundingsource identifier
PX=percentage or amount of value to be funded by source X As will be understood by those skilled in the relevant arts, once they have been made familiar with this disclosure, the example above is simple one relatively simple example of the manner in which a discretionary field provided in a payment protocol can be used to implement split pay tokens funded from multiple sources. A wide variety of other formats are possible.

At 7702, the user 104 causes the virtual wallet application 306 to route the pre-funded split-pay token request data set to the token administration system 100 associated with the wallet app 306. Conditioned upon successful adjudication of the request, at 7205 a suitably-configured pre-funded split-pay token data set 11 can be returned and stored in memory controlled by or otherwise associated with the user 104's virtual wallet application 306 or (as shown) in memory controlled by a third-party wallet or merchant app 300, 306B.

Pre-funded split-pay token data set 11 in accordance with such embodiments of the invention can comprise some or all of the following data items:

<security key><type code><currency><pre-funded negotiable amount>
<issuing token administrator/payment authorization code>
<pre-funded authorization key><transferability indicator><protocol identifier><authorized recipient information>
<funding source identifier(s)>

In such embodiments the data items can have the meanings and content described above. Alternatively, or in addition, some or all of the data items may be combined, or modified for efficiency in the split-pay process. For example, various combinations of the token <type code>, <payment authorization code> and/or <pre-funded authorization key> can comprise embedded codes flagging the token as a split-pay token, along with any other desired or required accounting or funding information, as described above and in the incorporated references.

At 2710, the user 104 uses his/her device 106 to navigate to a website 102 associated with a merchant identified by the restriction data, or approaches such a merchant's POS device 102, and uses the merchant app 300 to negotiate a purchase or other transaction to be fully or partly satisfied through use of the merchant-restricted pre-funded token data set 11. At 2711, the user causes the merchant app 300 to route the pre-funded split-pay token data set 11 to the merchant website or POS 120 as full or partial payment.

At 7701-7702, the merchant system 102 routes a transaction authorization request data set to the user 104's FI and/or token administrator 100 via third-party transaction processor(s) 108, using for example a third-party payment network 108. It is to be noted that in split-pay embodiments of the invention, using techniques described in the incorporated references, including particularly the use of discretionary fields provided by desired transaction protocols, the pre-funded split pay token data set 11 can be processed by any or all of merchant(s) 102 and transaction processor(s) 108 in exactly the same fashion as any other transaction payment data set. In other words, to such merchants and/or transaction processors the form of payment represented by the pre-funded split-pay payment token can be transparent to the merchant(s) and or transaction processor(s).

At 7701-7702, the merchant 102 can route to the token administrator identified by the <issuing token administrator/payment authorization code> field, optionally via third-party transaction processor 108, a transaction payment request data set, to cause payment to the merchant 102 of amount(s) sufficient to cover the requested transaction.

At 7704, the user 104's FI and/or token administrator 100 adjudicates the merchant's transaction authorization request data set by, for example, verifying the authenticity of the merchant-restricted pre-funded token data set 11 and the availability of sufficient funds in the funding sources identified by the <funding source identifier(s)> field. If, for example, sufficient funds are not available, in embodiments in which the pre-funded split-pay token request is not of a fully-negotiable type code, or does not include an acceptable <pre-funded authorization key>, the transaction request can be denied.

Conditioned on satisfaction of any restrictions checked at 7704, at 7707 the FI and/or token administrator 100 can access any funding sources identified with the split-pay token and debit the accounts (including specially-designated GL accounts associated with the token, as described above) and complete any further required payment processing to ensure payment in favor of the merchant 102, and to confirm completion of the transaction to either or both parties 104, 102.

As previously noted, the invention enables pluralities of existing pre-funded tokens may be combined, or otherwise used, to fund generation of single pre-funded token data sets 11 in accordance with any of the foregoing embodiments. In such embodiments, for example, a user 104, 105 of a data communication device 106 can cause use one or more input devices 610 of the device 106 to access, in memory associated with the at least one memory device at least, a first negotiable pre-funded token data set 11, the first negotiable pre-funded token data set 11 comprising data representing at least a first pre-funded negotiable amount and a first negotiable pre-funded payment authorization, and a second negotiable pre-funded token data set 11, the second negotiable pre-funded token data set 11 comprising data representing at least a second pre-funded negotiable amount and a second negotiable pre-funded payment authorization; wherein the first and second pre-funded negotiable amounts are the same or different and the first and second pre-funded payment authorizations are the same or different. Using the first and second negotiable pre-funded token data sets, the user 106 can cause the device, either on board the device or through communication with a pre-funded token administration system 100, to generate a third negotiable pre-funded token data set, the third negotiable pre-funded token data set comprising data representing at least: a third pre-funded negotiable amount, the third pre-funded negotiable amount being less than or equal to a sum of the first and second pre-funded negotiable amounts; and a combined negotiable pre-funded payment authorization which may be the same as or different than either of the first and second pre-funded payment authorizations. For example, a user 104, 105 wishing to combine such tokens can cause a virtual wallet application 306 of the users device to route two or more existing token data sets 11 to a token administrator 100, and in effect use the multiple tokens as funding sources for creation of a new token of value equal to the combined plurality. Such token data sets may, of course, be stored in any desired memory(ies), as described herein.

Moreover, such tokens may be used in payment transactions, in the same manner as any other tokens described above. For example, the user's device 106 can be caused to route to a merchant transaction system 102 a pre-funded transaction payment data set 11, the pre-funded transaction payment data set comprising data representing at least a pre-funded transaction payment amount and the combined negotiable pre-funded payment authorization.

It may be seen in the foregoing that the invention provides a very wide variety of devices, systems, methods, and programming instruction products for generating and enabling the use of pre-funded token data sets representing negotiable pre-funded payments.

In particular, the invention provides systems 100, 101, 102, 108 and devices 106, 106A, 106B, 300, 306, etc., and corresponding methods and programming products, enabling a data communication device 106 to, in accordance with instructions generated by at least one user input device 610 of the device 106, generate a pre-funded token request data set 11, the pre-funded token request data set comprising data representing at least an identifier associated with a pre-funded token funding source and a requested pre-funded negotiable amount, and, using at least one data communication system 612, 614, route the pre-funded token request data set 11 to a pre-funded token administration system 100. Such devices 106 are further enabled to using the same or another data communication systems, receive from the pre-funded token administration system 100 a negotiable pre-funded token data set 11, the negotiable pre-funded token data set comprising data representing at least a pre-funded negotiable amount and a negotiable pre-funded payment authorization.

In addition, such systems, devices, methods, and programming products can be configured to enable device(s) 106 to route to one or more merchant transaction systems 102 pre-funded transaction payment data sets 11, the pre-funded transaction payment data sets comprising data representing at least a pre-funded transaction payment amount and the negotiable pre-funded payment authorization. As explained above, such tokens 11 can in some embodiments be used for for multiple transactions by, for example, causing a device 106 to, in accordance with signals generated by the user input device(s) 610, route to one or more merchant transaction systems 120 a plurality of pre-funded transaction payment data sets 11, each pre-funded transaction payment data set 11 comprising data representing at least a pre-funded transaction payment amount and the negotiable pre-funded payment authorization, wherein a sum of the plurality of pre-funded transaction payment amounts is less than or equal to the pre-funded negotiable amount.

While the disclosure has been provided and illustrated in connection with various specific embodiments, many variations, combinations, and modifications of elements of the systems and processes shown may be may be made without departing from the scope of the inventive disclosure provided herein.

As a specific example, the disclosure and invention(s) described herein comprise a wide variety of types and forms of systems, components, and devices, which may be interconnected and used in a wide variety of different ways, which in many cases may be made to be equivalent to each other. The disclosure and invention(s) described herein are therefore not to be limited to the exact components, or combinations of components, or details of any methodology(ies) and/or construction(s) set forth above. Rather, such components and details may in many cases be modified and interchanged in a wide variety of ways to accomplish similar or equivalent results, without departing from the scope of the disclosed invention(s).

As a further example, study of the various use cases described above, and in the Figures, will also indicate clearly that the order of processes described herein may in many cases by altered considerably, without departing from the scope or the intended implementations of the invention.

Thus, except to the extent necessary or inherent in the systems, devices, and processes themselves, no particular order to steps, stages, or other components of methods, processes, systems or devices described in this disclosure, including the Figures, is intended or implied. In many cases the order of process steps may be varied without changing the purpose, effect, or import of the methods described.

The scope of the invention is to be defined solely by the appended claims, giving due consideration to applicable rules of construction, such as the doctrine of equivalents and related doctrines.

What is claimed is:

1. A user device comprising:
    at least one user input interface;
    at least one data communication interface;
    at least one data processor; and
    at least one persistent memory, the at least one persistent memory comprising secure data storage media and stored, machine-interpretable instructions adapted to configure the at least one data processor to:
        in accordance with instructions received by the at least one user input interface, access in the secure data storage media data representing at least a negotiable pre-funded token data set, the negotiable pre-funded token data set comprising data representing at least a pre-funded negotiable amount and a negotiable pre-funded payment authorization, the pre-funded negotiable amount associated with a general ledger account of a token administration system;
        using signals generated by the at least one user input interface, generate at least one secure negotiable pre-funded token transfer data set, the at least one secure negotiable pre-funded token transfer data set comprising data identifying at least one pre-funded token transfer recipient, data representing the negotiable pre-funded payment authorization, and at least one negotiable pre-funded token transfer amount;
        in accordance with an instruction to send a pre-funded token to the at least one pre-funded token transfer recipient, modifying the pre-funded token transfer data set used to generate the pre-funded token to include:
            data representing the same or another negotiable pre-funded payment authorization; and
            verification data for use in the authorization of the at least one recipient to access the pre-funded token;
        using the at least one data communication interface, route the at least one secure negotiable pre-funded token transfer data set to a network address associated with the token administration system, the at least one secure negotiable pre-funded token transfer data set to be associated with the general ledger account;
receive from the token administration system at least one pre-funded token associated with the general ledger account;
using the at least one data communication interface, route at least one pre-funded token associated with the at least one secure negotiable pre-funded token transfer data set to a network address associated with the at least one pre-funded token transfer recipient;
receive a confirmation, from the token administrator system, that a transaction associated with the at least one pre-funded token has been completed, wherein the general ledger account is debited by an amount associated with the transaction;
add additional authorized transaction value to the pre-funded token, wherein the general ledger account is credited when a payment is received for the additional authorized transaction value; and
receive, from the token administration system at least one new pre-funded token associated with the general ledger account, the at least one new pre-funded token comprising an updated authorized transaction value based on the competed transaction and the added additional authorized transaction value.

2. The user device of claim 1, wherein the at least one data processor is configured to:
generate the at least one secure negotiable pre-funded token transfer data set; and
wherein routing the secure negotiable pre-funded token transfer data set to the network address associated with the at least one pre-funded token transfer recipient is conditioned upon the data indicating that at least a portion of the pre-funded negotiable amount is transferable.

3. The user device of claim 1, wherein the at least one secure negotiable pre-funded token transfer data set comprises at least one gift personalization data set.

4. The user device of claim 3, wherein the at least one gift personalization data set comprises data representing at least one image.

5. The user device of claim 3, wherein the at least one gift personalization data set comprises data representing at least one text message.

6. The user device of claim 1, wherein the machine-interpretable instructions are adapted to configure the at least one data processor to:
using the at least one data communication system, route to at least one network address associated with the at least one pre-funded token transfer recipient a pre-funded token delivery notification data set, the pre-funded token delivery notification data set comprising at least data useful for causing a display of a second data communication device to display a notification of receipt of a negotiable pre-funded token data set.

7. The user device of claim 6, wherein the pre-funded token delivery notification data set comprises at least one gift personalization data set.

8. The user device of claim 7, wherein the at least one gift personalization data set comprises data representing at least one image.

9. The user device of claim 7, wherein the at least one gift personalization data set comprises data representing at least one text message.

10. The user device of claim 1, wherein the at least one secure negotiable pre-funded token transfer data set comprises data configured to cause a device associated with the network address associated with the at least one pre-funded token transfer recipient to initiate a recipient verification process.

11. The user device of claim 1, wherein the machine-interpretable instructions are adapted to configure the at least one data processor to generate a plurality of secure negotiable pre-funded token transfer data sets, each secure negotiable pre-funded token transfer data set comprising data identifying at least one network address associated with a pre-funded token transfer recipient and data representing the negotiable pre-funded payment authorization and at least one negotiable pre-funded token transfer amount, a sum of the plurality of negotiable pre-funded token transfer amounts being less than or equal to the pre-funded negotiable amount.

12. The user device of claim 11, wherein the machine-interpretable instructions are adapted to configure the at least one data processor to route at least one of the plurality of secure negotiable pre-funded token transfer data sets to the at least one network address.

13. The user device of claim 11, wherein each of the plurality of secure negotiable pre-funded token transfer data sets comprises data identifying a network address associated with a different pre-funded token transfer recipient.

14. The user device of claim 1, wherein at least one of generation and routing of the secure negotiable pre-funded token transfer data set to a network address associated with the at least one pre-funded token transfer recipient causes the data communication device to negate negotiability of a prefunded token data set associated with a pre-funded amount corresponding to that of the at least one negotiable pre-funded token transfer amount.

15. The user device of claim 1, wherein the at least one data communication system comprises at least one near-field communication system.

16. The user device of claim 1, wherein the at least one data communication system comprises at least one network communication system.

17. The user device of claim 1, wherein routing the secure negotiable pre-funded token transfer data set to a network address associated with the at least one pre-funded token transfer recipient excludes routing via a third party payment processor.

18. The user device of claim 1, wherein the at least one secure negotiable pre-funded token transfer data set comprises a payment protocol identifier that can be selected by at least one of a user generating the instructions and the recipient.

19. The user device of claim 1, wherein the machine-interpretable instructions are associated with a virtual wallet application.

20. The user device of claim 19, wherein the secure negotiable pre-funded token transfer data set is configured for processing by a second virtual wallet application.

* * * * *

UNITED STATES PATENT AND TRADEMARK OFFICE
CERTIFICATE OF CORRECTION

| | |
|---|---|
| PATENT NO. | : 11,210,648 B2 |
| APPLICATION NO. | : 15/453193 |
| DATED | : December 28, 2021 |
| INVENTOR(S) | : Edison U. Ortiz et al. |

It is certified that error appears in the above-identified patent and that said Letters Patent is hereby corrected as shown below:

On the Title Page

In the Related U.S. Application Data on Page 2, Column 1, Lines 12-13, the phrase: "which is a continuation-in-part of application No. 14/879,913," should be removed.

In the Related U.S. Application Data on Page 2, Column 1, Line 18, the phrase: "filed on May 6, 2015, now Pat. No. 10,846,692," should be removed.

Signed and Sealed this
Twenty-fifth Day of October, 2022

Katherine Kelly Vidal
*Director of the United States Patent and Trademark Office*